United States Patent
Tao

(10) Patent No.: US 11,711,748 B2
(45) Date of Patent: *Jul. 25, 2023

(54) METHOD AND APPARATUS OF COMMUNICATION BETWEEN TERMINAL AND BASE STATION, AND NETWORK ACCESS METHOD AND APPARATUS OF A TERMINAL

(71) Applicant: ALIBABA GROUP HOLDING LIMITED, Grand Cayman (KY)

(72) Inventor: Zhen Tao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 32 days.

This patent is subject to a terminal disclaimer.

(21) Appl. No.: 17/153,267

(22) Filed: Jan. 20, 2021

(65) Prior Publication Data

US 2021/0143896 A1   May 13, 2021

Related U.S. Application Data

(63) Continuation of application No. PCT/CN2019/095709, filed on Jul. 12, 2019.

(30) Foreign Application Priority Data

Jul. 20, 2018   (CN) .......................... 201810806527.1

(51) Int. Cl.
*H04W 48/08* (2009.01)
*H04W 52/02* (2009.01)
(Continued)

(52) U.S. Cl.
CPC ............. *H04W 48/08* (2013.01); *G16Y 10/75* (2020.01); *G16Y 40/10* (2020.01);
(Continued)

(58) Field of Classification Search
CPC .......... G16Y 10/75; G16Y 40/10; H04B 7/14; H04B 7/15528; H04L 5/00; H04W 48/08;
(Continued)

(56) References Cited

U.S. PATENT DOCUMENTS

2015/0103733 A1   4/2015  Ahmadi
2019/0029061 A1*  1/2019  Feng ..................... H04W 80/08

FOREIGN PATENT DOCUMENTS

CN         101389121 A      3/2009
CN         101998547 A      3/2011
(Continued)

OTHER PUBLICATIONS

PCT International Search Report and Written Opinion dated Feb. 11, 2019, issued in corresponding International Application No. PCT/CN2018/117107 (12 pgs.).

(Continued)

*Primary Examiner* — Zhensheng Zhang
(74) *Attorney, Agent, or Firm* — Finnegan, Henderson, Farabow, Garrett & Dunner, LLP

(57) ABSTRACT

Embodiments of the present application provide a method and apparatus of communication between a terminal and a base station. The communication method between a terminal and a base station performed by the terminal includes: sending, by the terminal, a network access request frame with a first preamble to a relay device. The relay device may be configured to receive the network access request frame according to the first preamble, send the network access request frame with a second preamble to the base station, and receive a network access response frame returned by the base station. The length of the second preamble may be smaller than that of the first preamble. The communication method may further includes receiving, by the terminal, the network access response frame sent by the relay device.

17 Claims, 8 Drawing Sheets

(51) Int. Cl.
  *G16Y 40/10* (2020.01)
  *G16Y 10/75* (2020.01)
  *H04B 7/155* (2006.01)
  *H04W 48/14* (2009.01)
  *H04W 88/16* (2009.01)

(52) U.S. Cl.
  CPC ........ *H04B 7/15528* (2013.01); *H04W 48/14* (2013.01); *H04W 52/0235* (2013.01); *H04W 88/16* (2013.01)

(58) Field of Classification Search
  CPC . H04W 48/14; H04W 52/02; H04W 52/0235; H04W 74/00; H04W 76/28; H04W 84/047; H04W 88/16; Y02D 30/70
  See application file for complete search history.

(56) References Cited

FOREIGN PATENT DOCUMENTS

| | | |
|---|---|---|
| CN | 103444110 A | 12/2013 |
| CN | 104065452 A | 9/2014 |
| CN | 106686558 A | 5/2017 |
| CN | 107105488 A | 8/2017 |
| WO | WO 2017/166138 A1 | 10/2017 |
| WO | WO 2019/105291 A1 | 6/2019 |

OTHER PUBLICATIONS

First Chinese Search Report issued in corresponding Chinese Application No. 201810806527.1 dated Apr. 29, 2021 (2 pages).

\* cited by examiner

```
┌─────────────────────────────────────────────────────────────────┐
│ The terminal sends a network access request frame with a first  │
│ preamble to a relay device, wherein the relay device is         │──── 101
│ configured to receive the network access request frame          │
│ according to the first preamble, send the network access        │
│ request frame with a second preamble to the base station, and   │
│ receive a network access response frame returned by the base    │
│ station, and the length of the second preamble is smaller than  │
│ that of the first preamble.                                     │
└─────────────────────────────────────────────────────────────────┘
                                  │
                                  ▼
┌─────────────────────────────────────────────────────────────────┐
│ The terminal receives the network access response frame sent    │──── 102
│ by the relay device                                             │
└─────────────────────────────────────────────────────────────────┘
```

FIG. 1

```
┌─────────────────────────────────────────────────────────────────┐
│ The terminal sends a network access request frame with a        │──── 201
│ second preamble in a normal mode                                │
└─────────────────────────────────────────────────────────────────┘
                                  │
                                  ▼
┌─────────────────────────────────────────────────────────────────┐
│ If the terminal receives a network access response frame within │
│ a second receiving window after sending the network access      │──── 202
│ request frame with the second preamble, the terminal is         │
│ switched from the normal mode to a relay mode                   │
└─────────────────────────────────────────────────────────────────┘
                                  │
                                  ▼
┌─────────────────────────────────────────────────────────────────┐
│ The terminal sends a network access request frame with a first  │──── 203
│ preamble in the relay mode, and the length of the second        │
│ preamble is smaller than that of the first preamble             │
└─────────────────────────────────────────────────────────────────┘
                                  │
                                  ▼
┌─────────────────────────────────────────────────────────────────┐
│ If the terminal receives a network access response frame within │
│ a first receiving window after sending the network access       │
│ request frame with the first preamble, or if the terminal does  │──── 204
│ not receive a network access response frame within a first      │
│ receiving window or a second receiving window after sending     │
│ the network access request frame with the first preamble, the   │
│ terminal is switched from the relay mode to the normal mode     │
└─────────────────────────────────────────────────────────────────┘
```

FIG. 2

METHOD AND APPARATUS OF COMMUNICATION BETWEEN TERMINAL AND BASE STATION, AND NETWORK ACCESS METHOD AND APPARATUS OF A TERMINAL

CROSS REFERENCE TO RELATED APPLICATIONS

The present application claims the benefits of priority to International Application No. PCT/CN2019/095709, filed on Jul. 12, 2019, which claims priority to Chinese Patent Application No. 201810806527.1, filed on Jul. 20, 2018, the entire contents of which are incorporated in the present application by reference in their entireties.

BACKGROUND

The Internet of Things technology is the third information technology revolution after computers and the Internet, with the advantages of real-time performance and interactivity, and has been widely used in urban management, digital homes, positioning and navigation, logistics management, security systems, and other fields. LoRa (Long Range) is an ultra-long-distance transmission scheme based on spread spectrum technology in the Internet of Things, and has the characteristics of long transmission distance, low power consumption, multiple nodes, low cost, and the like.

A LoRa network usually includes a terminal, a base station, and a server. Generally, an uplink signal of the terminal is directly received by the base station, and a downlink signal of the base station is directly received by the terminal. However, in some cases, signals of the base station and the terminal cannot reach each other due to attenuation. For example, if the terminal is installed underground, the signal strength may be attenuated, making communication between the base station and the terminal difficult or even impossible.

SUMMARY OF THE DISCLOSURE

In view of the above problems, embodiments of the present application are proposed to provide a method of communication between a terminal and a base station, an apparatus of communication between a terminal and a base station, a network access method of a terminal, and a network access apparatus of a terminal.

The embodiments of the present application disclose a method performed by a terminal for communication with a base station, including sending, by the terminal, a network access request frame with a first preamble to a relay device, wherein the relay device is configured to receive the network access request frame according to the first preamble, send the network access request frame with a second preamble to the base station, and receive a network access response frame returned by the base station, the length of the second preamble being shorter than that of the first preamble; and receiving, by the terminal, the network access response frame sent by the relay device.

The embodiments of the present application also disclose a network access method performed by a terminal, including: sending, by the terminal in a normal mode, a network access request frame with a second preamble; in accordance with determining that the terminal receives a network access response frame within a second receiving window after sending the network access request frame with the second preamble, switching the terminal from the normal mode to a relay mode; sending, by the terminal in the relay mode, a network access request frame with a first preamble, the length of the second preamble being shorter than that of the first preamble; and in accordance with determining that the terminal receives a network access response frame within a first receiving window after sending the network access request frame with the first preamble, or in accordance with determining that the terminal does not receive a network access response frame within a first receiving window, or a second receiving window after sending the network access request frame with the first preamble, switching the terminal from the relay mode to the normal mode.

The embodiments of the present application also disclose a method performed by a terminal in communication with a base station, including: in accordance with determining that the terminal accesses a network in a normal mode, sending, by the terminal in the normal mode, an uplink data frame with a second preamble to the base station; receiving, by the terminal, a downlink data frame returned by the base station; in accordance with determining that the terminal accesses a network in a relay mode, sending, by the terminal in the relay mode, an uplink data frame with a first preamble to a relay device, wherein the relay device is configured to replace the first preamble with a second preamble and forward the uplink data frame with the second preamble to the base station, the length of the second preamble being shorter than that of the first preamble; and receiving, by the terminal, a downlink data frame returned by the base station and forwarded by the relay device.

The embodiments of the present application also disclose a method of communication between a terminal and a base station, including receiving, by a relay device communicatively coupled to the terminal and the base station, a network access request frame with a first preamble sent by the terminal; replacing, by the relay device, the first preamble with a second preamble; sending the network access request frame with the second preamble to the base station, the length of the second preamble being shorter than that of the first preamble; receiving, by the relay device, a network access response frame returned by the base station; and sending the network access response frame to the terminal.

The embodiments of the present application also disclose a network access method performed by a relay device, including: receiving, by the relay device, a network access request frame with a first preamble sent by a terminal communicatively coupled to the relay device, the terminal operating in a relay mode; replacing, by the relay device, the first preamble with a second preamble; sending the network access request frame with the second preamble to the base station, the length of the second preamble being shorter than that of the first preamble; receiving, by the relay device, a network access response frame returned by the base station; and sending the network access response frame to the terminal.

The embodiments of the present application also disclose a method of supporting communication between a terminal and a base station, including receiving, by a relay device communicatively coupled to the terminal and the base station, an uplink data frame with a first preamble sent by the terminal that accesses a network in a relay mode; replacing, by the relay device, the first preamble with a second preamble; sending the uplink data frame with the second preamble to the base station, the length of the second preamble being shorter than that of the first preamble; and receiving, by the relay device, a downlink data frame returned by the base station; and forwarding the downlink data frame to the terminal.

The embodiments of the present application also disclose a terminal in communication with a base station, including memory storing a set of instructions; and one or more processors configured to execute the set of instructions to cause the apparatus to perform: sending a network access request frame with a first preamble to a relay device, wherein the relay device is configured to receive the network access request frame according to the first preamble, send the network access request frame with a second preamble to the base station, and receive a network access response frame returned by the base station, the length of the second preamble being shorter than that of the first preamble; and receiving the network access response frame sent by the relay device.

The embodiments of the present application also disclose a terminal configured to perform network access apparatus, including: a memory storing a set of instructions; and one or more processors configured to execute the set of instructions to cause the apparatus to perform sending a network access request frame with a second preamble in a normal mode; switching from the normal mode to a relay mode, in accordance with determining that the terminal receives a network access response frame within a second receiving window after sending the network access request frame with the second preamble; sending a network access request frame with a first preamble in the relay mode, the length of the second preamble being shorter than that of the first preamble; and switching from the relay mode to the normal mode, in accordance with determining that the terminal receives a network access response frame within a first receiving window after sending the network access request frame with the first preamble, or the terminal does not receive a network access response frame within a first receiving window or a second receiving window after sending the network access request frame with the first preamble.

The embodiments of the present application also disclose a terminal in communication with a base station, including: a memory storing a set of instructions; and one or more processors configured to execute the set of instructions to cause the apparatus to perform: in accordance with determining that the terminal accesses a network in a normal mode, sending an uplink data frame with a second preamble to the base station in the normal mode; receiving a downlink data frame returned by the base station; in accordance with determining that the terminal accesses a network in a relay mode, sending an uplink data frame with a first preamble to a relay device in the relay mode, wherein the relay device is configured to replace the first preamble with a second preamble and forward the uplink data frame with the second preamble to the base station, the length of the second preamble being shorter than that of the first preamble; and receiving a downlink data frame returned by the base station and forwarded by the relay device.

The embodiments of the present application also disclose a terminal in communication with a base station, including: a memory storing a set of instructions; and one or more processors configured to execute the set of instructions to cause the apparatus to perform: in accordance with determining that the terminal accesses a network in a normal mode, sending an uplink data frame with a second preamble to the base station in the normal mode: receiving a downlink data frame returned by the base station; in accordance with determining that the terminal accesses a network in a relay mode, sending an uplink data frame with a first preamble to a relay device in the relay mode, wherein the relay device is configured to replace the first preamble with a second preamble and forward the uplink data frame with the second preamble to the base station, the length of the second preamble being shorter than that of the first preamble; and receiving a downlink data frame returned by the base station and forwarded by the relay device.

The embodiments of the present application also disclose a relay device for relaying communication between a terminal and a base station, including: a memory storing a set of instructions; and one or more processors configured to execute the set of instructions to cause the apparatus to perform: receiving a network access request frame with a first preamble sent by the terminal; replacing the first preamble with a second preamble; sending the network access request frame with the second preamble to the base station, the length of the second preamble being shorter than that of the first preamble; receiving a network access response frame returned by the base station; and sending the network access response frame to the terminal.

The embodiments of the present application also disclose a relay device, including: a memory storing a set of instructions; and one or more processors configured to execute the set of instructions to cause the apparatus to perform: receiving a network access request frame with a first preamble sent by a terminal communicatively coupled to the relay device, the terminal operating in a relay mode; replacing the first preamble with a second preamble; sending the network access request frame with the second preamble to a base station, the length of the second preamble being shorter than that of the first preamble; receiving a network access response frame returned by the base station; and sending the network access response frame to the terminal.

The embodiments of the present application also disclose a relay device configured to support communication between a terminal and a base station, including: a memory storing a set of instructions; and one or more processors configured to execute the set of instructions to cause the apparatus to perform: receiving an uplink data frame with a first preamble sent by the terminal that accesses a network in a relay mode; replacing the first preamble with a second preamble; sending the uplink data frame with the second preamble to the base station, the length of the second preamble being shorter than that of the first preamble; receiving a downlink data frame returned by the base station; and forwarding the downlink data frame to the terminal.

The embodiments of the present application also disclose a method performed by a terminal in communication with a base station, including: sending, by the terminal, a first network access request frame to a relay device, the network access request frame comprising a wake-up sequence composed of a plurality of consecutive wake-up data frames, wherein the relay device is configured to receive the network access request frame according to the wake-up sequence, send a second network access request frame to the base station, and receive a network access response frame returned by the base station; and receiving, by the terminal, the network access response frame sent by the relay device.

The embodiments of the present application also disclose a method of communication between a terminal and a base station, including: receiving, by a relay device, a first network access request frame sent by the terminal, the network access request frame comprising a wake-up sequence composed of a plurality of consecutive wake-up data frames; sending, by the relay device, a second network access request frame to the base station; and receiving, by the relay device, a network access response frame returned by the base station, and sending the network access response frame to the terminal.

The embodiments of the present application also disclose a method of communication between a terminal and a base station, including: determining, by the relay device, that the number of network access request frames with a first preamble received within a first time range exceeds a first threshold value; stopping, by the relay device, monitoring or receiving the network access request frame with the first preamble within a second time range after the first time range; restarting, by the relay device, receiving the network access request frame with the first preamble after the second time range; and receiving, by the relay device, a network access response frame returned by the base station, and sending the network access response frame to the terminal.

The embodiments of the present application also disclose a non-transitory computer readable medium that stores a set of instructions that is executable by at least one processor of a computer to cause the computer to perform a method for communication between a terminal and a base station, the method comprising: sending, by the terminal, a network access request frame with a first preamble to a relay device, wherein the relay device is configured to receive the network access request frame according to the first preamble, send the network access request frame with a second preamble to the base station, and receive a network access response frame returned by the base station, the length of the second preamble being shorter than that of the first preamble; and receiving, by the terminal, the network access response frame sent by the relay device The embodiments of the present application also disclose a non-transitory computer readable medium that stores a set of instructions that is executable by at least one processor of a computer to cause the computer to perform a method for communication between a terminal and a base station, the method comprising: receiving, by a relay device communicatively coupled to the terminal and the base station, a network access request frame with a first preamble sent by the terminal; replacing, by the relay device, the first preamble with a second preamble; sending the network access request frame with the second preamble to the base station, the length of the second preamble being shorter than that of the first preamble; receiving, by the relay device, a network access response frame returned by the base station; and sending the network access response frame to the terminal.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 1 is a flowchart of an example method of communication between a terminal and a base station, consistent with some embodiments of the present disclosure.

FIG. 2 is a flowchart of an example network access method of a terminal, consistent with some embodiments of the present disclosure.

DETAILED DESCRIPTION

Figure 3:
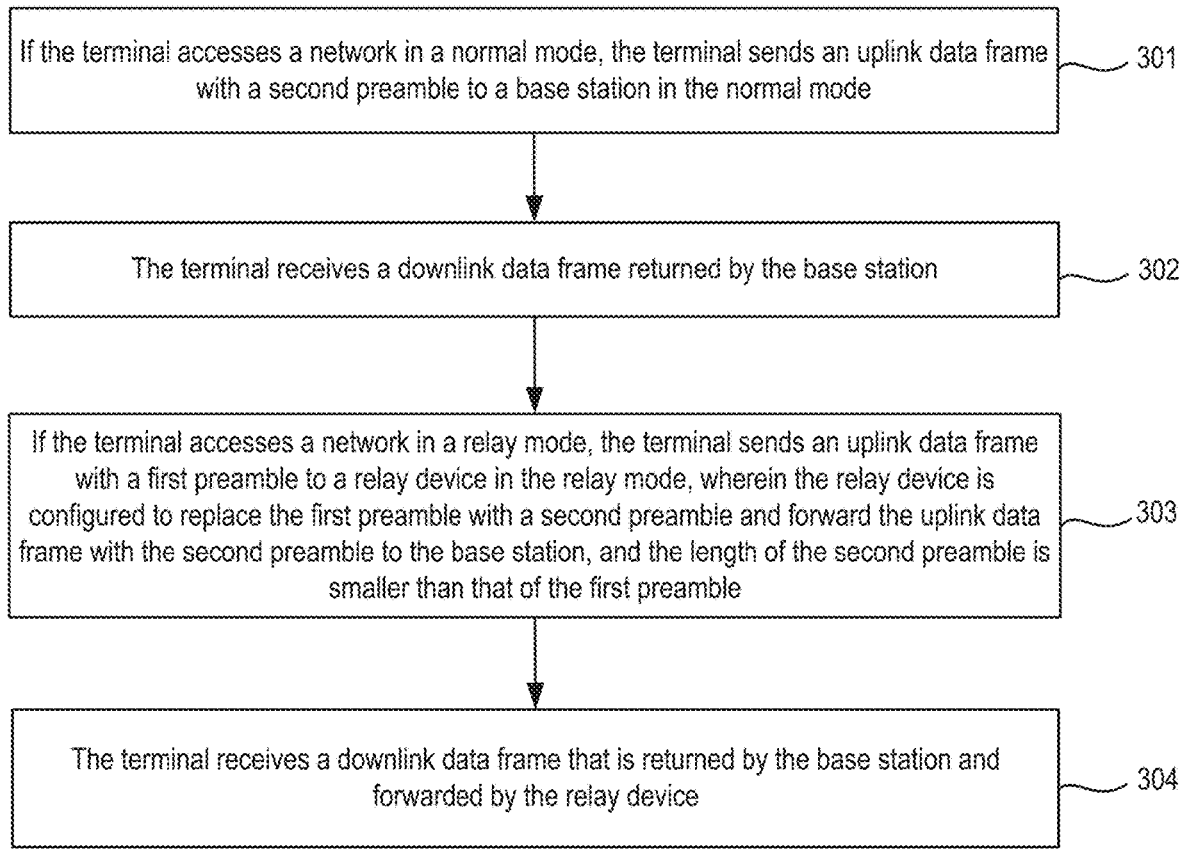
FIG. 3 is a flowchart of an example method of communication between a terminal, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

A LoRa network includes a terminal, a base station, and a server. The terminal has a LoRa network connection capability and accesses the LoRa network. According to different application scenarios where the LoRa network is deployed, the terminal may include different electronic devices. For example, when the LoRa network is adopted in urban management, the terminal may include a smart electric meter. In another example, when the LoRa network is adopted in digital homes, the terminal may include various smart home appliances.

A base station, also referred to as a gateway or a concentrator in the LoRa network, has the function of wireless connection convergence. In some embodiments, the function performed by the base station includes providing an entry for the terminal to access the LoRa network, forwarding data from the server or the terminal, or realizing data exchange between the terminal and the server. In some embodiments, the base station can also exchange data with other base stations within a signal coverage area of the base station by transmitting radio frames.

The server may include a server or a server cluster, which is configured to perform service processing according to data obtained from the base station or the terminal, and to control a working mode and a working state of the base station or the terminal.

The embodiments of the present application include arranging a LoRa relay device between a terminal and a base station, and establishing communication between the terminal and the base station through the LoRa relay device.

In some embodiments, a terminal may send a network access request frame with a first preamble to a relay device. The relay device may forward the network access request frame to a base station. Further, the relay device may send a network access response frame returned by the base station to the terminal, thereby completing the network access process of the terminal.

As disclosed herein, various embodiments of the present application provide advantages. In some embodiments, after the terminal accesses a network through the relay device, the terminal may send an uplink data frame with the first preamble to the relay device. The relay device may forward the uplink data frame to the base station. The relay device may also send a downlink data frame returned by the base station to the terminal, thereby completing the process of communication between the terminal and the base station.

In some embodiments of the present application, the terminal may access a network through the relay device and communicate with the base station. In some embodiments, the frame format for the wireless communication of the terminal via LoRaWAN is not changed. The length of a preamble may be increased. As such, the relay device does not adopt a private frame structure. Rather, the relay device is compatible with the LoRaWAN standard, thereby facilitating unification of the LoRa relay standard for all manufacturers.

In some embodiments, the procedure of communication between a terminal and a base station is introduced from the perspective of the terminal.

FIG. 1 shows a flowchart of an example method of communication between a terminal and a base station, consistent with some embodiments of the present disclosure.

In some embodiments in step 101, the terminal sends a network access request frame with a first preamble to a relay device. In some embodiments, the relay device is configured to receive the network access request frame according to the first preamble, send the network access request frame with a second preamble to the base station, and receive a network access response frame returned by the base station. In some embodiments, the length of the second preamble is smaller than that of the first preamble.

In some embodiments, in a standard network access process, the terminal sends a network access request frame with a second preamble to the base station. If the terminal can receive the network access response frame returned by the base station, the standard network access is successful.

However, when the signal strength between the terminal and the base station is not strong enough, the network access request frame sent by the terminal may not be able to reach the base station, or the network access response frame returned by the base station may not be able reach the terminal. Accordingly, the standard network access may fail.

Some embodiments of the present application include a LoRa relay device arranged between the terminal and the base station to establish communication between the terminal and the base station through the LoRa relay device.

For example, the terminal may be buried underground and located 500 meters away from the base station. If the terminal cannot receive signal from a base station due to ground obstacles, the relay device may be placed above the ground and at the buried point of the terminal to relay the signal.

In some embodiments of the present application, as a standard node, the relay device first accesses the LoRa network according to a standard network access procedure. That is, the relay device first sends a network access request frame with a second preamble to the base station, and then receives a network access response frame returned from the base station. After the standard network access is successful, the relay device enters an intermittent sleep state to reduce power consumption.

When the standard network access procedure fails, the terminal may send a network access request frame with a first preamble to the relay device, which has already accessed a network.

In some embodiments, the preamble is a regular wireless signal used to notify a wireless receiver that the wireless signal following the preamble contains valid information.

In some embodiments, each of the second preamble and the first preamble is a segment of wireless signal before a network access request frame.

The second preamble is a standard preamble, which is a preamble in a standard format specified by the LoRaWAN protocol. In some embodiments, the first preamble is a long preamble, and the length of the first preamble is longer than that of the second preamble. In some embodiments, the length of the preamble may include a duration.

In some embodiments, another purpose of the first preamble is to activate a sleeping wireless receiver, so the length of the first preamble is longer than that of the second preamble. For example, if a sleep cycle of a receiver is 4 seconds, the length of the first preamble can be at least 4 seconds.

In some embodiments, the relay device periodically wakes up from an intermittent sleep state, and the relay device detects whether there is a first preamble during the wake-up. If a first preamble is detected, the relay device activates a data receiving function and receives a radio frame after the first preamble.

In some embodiments of the present application, step 101 may include the following sub-steps.

In some embodiments, in sub-step S11, if the terminal does not receive the network access response frame within a first receiving window or a second receiving window after sending a network access request frame with a second preamble, the terminal sends the network access request frame with the first preamble to the relay device.

In some embodiments, in sub-step S12, if the terminal receives the network access response frame within a second receiving window after sending a network access request frame with a second preamble, the terminal sends the network access request frame with the first preamble to the relay device.

In some embodiments, according to the LoRaWAN protocol, after each uplink transmission, the terminal opens two short receiving windows, including a first receiving window RX (receive) 1 and a second receiving window RX2. The respective start times of the first receiving window and the second receiving window can be specified with reference to the end time of the uplink transmission.

In some embodiments of the present application, the relay device is set to perform downlink transmission to the terminal within the second receiving window after the uplink transmission of the terminal.

In some embodiments, if the terminal does not receive the network access response frame within the first receiving window or the second receiving window after sending the network access request frame with the second preamble, it is considered that the standard network access fails. Subsequently, the terminal sends the network access request frame with the first preamble to the relay device.

In some embodiments, if the terminal receives the network access response frame within the second receiving window after sending the network access request frame with the second preamble, it is considered that the standard network access fails. Subsequently, the terminal sends the network access request frame with the first preamble to the relay device.

In some embodiments, when the terminal receives the network access response frame within the first receiving window after sending the network access request frame with the second preamble, is it considered that the standard network access is successful.

In some embodiments of the present application, if the terminal receives a network access request frame within a first receiving window after sending the network access request frame with the first preamble, the terminal sends a network access request frame with a second preamble to the base station.

In some embodiments, if the terminal receives a network access request frame sent by the base station within the first receiving window after sending the network access request frame with the first preamble, it is considered that the signal strength between the terminal and the base station may be sufficient to support communication. The terminal may initiate the standard network access procedure again and send a network access request frame with a second preamble to the base station.

In some embodiments of the present application, if the terminal does not receive the network access response frame within the first receiving window or the second receiving window after sending the network access request frame with the first preamble, the terminal sends the network access request frame with the second preamble to the base station.

In some embodiments, if the terminal does not receive the network access request frame within the first receiving window or the second receiving window after sending the network access request frame with the first preamble, it is considered that the network access procedure through the relay device also fails. Then after sleeping for a period of time, the terminal may initiate the standard network access procedure to the base station again.

In some embodiments, only when the terminal receives the network access response frame within the second receiving window after sending the network access request frame with the first preamble, it is considered that the terminal successfully accesses the network through the relay device.

In some embodiments of the present application, after the relay device receives the network access request frame with the first preamble sent by the terminal, the relay device replaces the first preamble before the network access request frame with a second preamble. Then, the relay device forwards the network access request frame with the second preamble to the base station.

In some embodiments, after receiving the network access request frame forwarded by the relay device, the base station returns a network access response frame to the relay device. The network access response frame also carries the second preamble, and the relay device receives the network access response frame according to the second preamble. Finally, the relay device returns the network access response frame with the second preamble to the terminal, and the terminal can successfully access the network.

In some embodiments, in step 102, the terminal receives the network access response frame sent by the relay device. The terminal can complete the network access after receiving the network access response frame forwarded by the relay device.

In some embodiments of the present application, step 102 may include the following sub-step.

In some embodiments, in sub-step S21, the terminal receives the network access response frame sent by the relay device within a second receiving window after sending the network access request frame with the first preamble.

In some embodiments of the present application, the relay device performs downlink transmission to the terminal within a second receiving window after the uplink transmission performed by the terminal.

Therefore, the terminal may receive the network access response frame sent by the relay device within the second receiving window after sending the network access request frame with the first preamble.

In some embodiments of the present application, after receiving the network access response frame, the terminal may further send an uplink data frame with the first preamble to the relay device. The relay device may be further configured to receive the uplink data frame according to the first preamble, send the uplink data frame with a second preamble to the base station, and receive a downlink data frame returned by the base station.

After the terminal successfully accesses the network through the relay device, each uplink data frame sent by the terminal carries a first preamble. The relay device receives the uplink data frame according to the first preamble.

After receiving the uplink data frame, the relay device can replace the first preamble before the uplink data frame with a second preamble, and then send the uplink data frame with the second preamble to the base station.

After receiving the uplink data frame, the base station returns a downlink data frame with a second preamble to the relay device, and the relay device forwards the downlink data frame with the second preamble to the terminal.

In some embodiments of the present application, the terminal may further receive the downlink data frame sent by the relay device.

The terminal can receive the downlink data frame returned by the base station and forwarded by the relay device, thereby completing the communication between the terminal and the base station.

In some embodiments of the present application, the step of receiving, by the terminal, the downlink data frame sent by the relay device may include the following sub-step;

In some embodiments, in sub-step S31, the terminal receives the downlink data frame sent by the relay device within a second receiving window after the terminal sends the uplink data frame with the first preamble.

In some embodiments of the present application, the relay device can perform downlink transmission to the terminal within a second receiving window after the terminal performs the uplink transmission.

As a result, the terminal may receive the downlink data frame sent by the relay device within the second receiving window after the terminal sends the uplink data frame with the first preamble.

In some embodiments of the present application, a terminal may send a network access request frame with a first preamble to a relay device, and the relay device may forward the network access request frame to a base station. The relay device may further send a network access response frame returned from the base station to the terminal to complete the network access process of the terminal.

After the terminal accesses a network through the relay device, the terminal may send an uplink data frame with the first preamble to the relay device, and the relay device may forward the uplink data frame to the base station. The relay device may then send a downlink data frame returned by the base station to the terminal, thereby completing the process of communication between the terminal and the base station.

In some embodiments of the present application, the terminal may access a network through the relay device and communicate with the base station. In some embodiments of the present application, the frame format for LoRaWAN wireless communication of the terminal is not changed, and the length of a preamble can be increased. As such, the relay device does not have to adopt a private or a customized frame structure, an can be is compatible with the LoRaWAN standard, thereby facilitating unification of LoRa relay standard for all manufacturers.

In some embodiments, the network access procedure of a terminal is introduced from the perspective of the terminal.

FIG. 2 shows a flowchart of an example network access method of a terminal, consistent with some embodiments of the present disclosure.

In some embodiments in step 201, the terminal sends, in a normal mode, a network access request frame with a second preamble.

In some embodiments of the present application, the terminal has two working modes, including a normal mode and a relay mode. The terminal may initiate a network access procedure in the normal mode or the relay mode.

In some embodiments, when the terminal initiates the network access procedure in the normal mode, the terminal may first send the network access request frame with the second preamble to the base station. In some embodiments, the manner of sending the network access request may include broadcast, unicast, etc.

In some embodiments, in step 202, when the terminal receives a network access response frame within a second receiving window after the terminal sends the network access request frame with the second preamble, the terminal can switch from the normal mode to a relay mode.

In some embodiments of the present application, it can be specified that the relay device sends data to the terminal within the second receiving window after the uplink transmission of the terminal.

In some embodiments, under the normal mode, when the terminal receives the network access response frame within the second receiving window after sending the network access request frame with the second preamble, it can be determined that the network access response frame is forwarded by the relay device to the terminal, instead of being directly received from the base station. Accordingly, the terminal can be switched from the normal mode to the relay mode, and the network access procedure can be initiated in the relay mode.

In some embodiments of the present application, the terminal may receive the network access response frame within the first receiving window after sending the network access request frame with the second preamble, so as to access a network in the normal mode.

In some embodiments, when the terminal receives the network access response frame within the first receiving window after sending the network access request frame with the second preamble in the normal mode, it can be determined that the network access response frame is directly sent from the base station and directly received by the terminal. Accordingly, the terminal accesses the network in the normal mode.

In some embodiments, in step 203, the terminal sends, in the relay mode, a network access request frame with a first preamble. In some embodiments, the length of the second preamble is smaller than that of the first preamble.

In some embodiments, if the terminal initiates the network access procedure in the relay mode, the terminal may first send a network access request frame with a first preamble to a relay device. In some embodiments, the manner of sending the network access request frame may include broadcast, unicast, etc.

In some embodiments, in step 204, when the terminal receives a network access response frame within a first receiving window after sending the network access request frame with the first preamble, the terminal can switch from the relay mode to the normal mode. In some embodiments, when the terminal does not receive a network access response frame within a first receiving window or a second receiving window after sending the network access request frame with the first preamble, the terminal can switch from the relay mode to the normal mode.

In some embodiments, when the terminal receives the network access response frame within the first receiving window after sending the network access request frame with the first preamble in the relay mode, it can be determined that the network access response frame is directly sent from the base station and directly received by the terminal. Accordingly, the terminal may switch to the normal mode and try to access the network in the normal mode.

In some embodiments, when the terminal does not receive the network access response frame within the first receiving window or within the second receiving window after sending the network access request frame with the first preamble in the relay mode, it is determined that the network access procedure through the relay device fails. The terminal may initiate the standard network access procedure again with the base station after sleeping for a period of time.

In some embodiments of the present application, the terminal may receive the network access response frame within the second receiving window after sending the network access request frame with the first preamble, so as to access a network in the relay mode.

In some embodiments, when the terminal receives the network access response frame within the second receiving window after sending the network access request frame with the first preamble, it is determined that the terminal successfully accesses the network through the relay device.

In some embodiments of the present application, a terminal may send a network access request frame with a first preamble to a relay device, and the relay device may forward the network access request frame to a base station. The relay device may then send a network access response frame received from the base station to the terminal, thereby completing the network access process of the terminal.

In some embodiments, the communication procedure after the network access of a terminal is introduced from the perspective of the terminal.

FIG. 3 shows a flowchart of an example method of communication between a terminal and a base station, consistent with some embodiments of the preset disclosure.

In some embodiments, in step 301, if the terminal accesses a network in a normal mode, the terminal can send, in the normal mode, an uplink data frame with a second preamble to the base station.

In some embodiments of the present application, the terminal has two working modes, including a normal mode and a relay mode. The terminal may initiate a network access procedure in the normal mode or the relay mode.

If the terminal has accessed the network in the normal mode the terminal can add the second preamble before the uplink data frame in a data uplink manner, and then send the uplink data frame with the second preamble to the base station.

In some embodiments, in step 302, the terminal can receive a downlink data frame returned by the base station.

In some embodiments, The terminal directly receives the downlink data frame returned by the base station.

In some embodiments of the present application, step 302 may include the following sub-step. In sub-step S41, the terminal can receive the downlink data frame returned by the base station within a first receiving window after sending the uplink data frame with the second preamble.

The terminal may directly receive the downlink data frame returned by the base station within the first receiving window after sending the uplink data frame with the second preamble in the normal mode.

In some embodiments, in step 303, if the terminal accesses a network in a relay mode, the terminal can send, in the relay mode, an uplink data frame with a first preamble to a relay device. In some embodiments, the relay device is configured to replace the first preamble with a second preamble, and forward the uplink data frame with the second preamble to the base station. In some embodiments, the length of the second preamble is smaller than that of the first preamble.

In some embodiments, if the terminal has accessed a network in the relay mode, the terminal can add a first preamble before an uplink data frame in a data uplink manner, and then send the uplink data frame with the first preamble to the relay device.

In some embodiments, after receiving the uplink data frame, the relay device replaces the first preamble with a second preamble, and forwards the uplink data frame with the second preamble to the base station.

In some embodiments, in step 304, the terminal receives a downlink data frame returned by the base station and forwarded by the relay device.

In some embodiments of the present application, step 304 may include the following sub-step.

In sub-step S51, the terminal receives the downlink data frame returned by the base station and forwarded by the relay device within a second receiving window after sending the uplink data frame with the first preamble.

In some embodiments of the present application, it can be specified that the relay device initiates downlink transmission to the terminal within the second receiving window after the uplink transmission of the terminal.

In some embodiments, the terminal may receive the downlink data frame returned by the base station and forwarded by the relay device within the second receiving window after sending the uplink data frame with the first preamble in the relay mode.

In some embodiments of the present application, the terminal can access a network through the relay device. The terminal may send an uplink data frame with the first preamble to the relay device, and the relay device may forward the uplink data frame to the base station. The relay device may then send a downlink data frame returned by the base station to the terminal, thereby completing the process of communication between the terminal and the base station.

In some embodiments, the procedure of communication between a terminal and a base station can be introduced from the perspective of a relay device.

Figure 4:
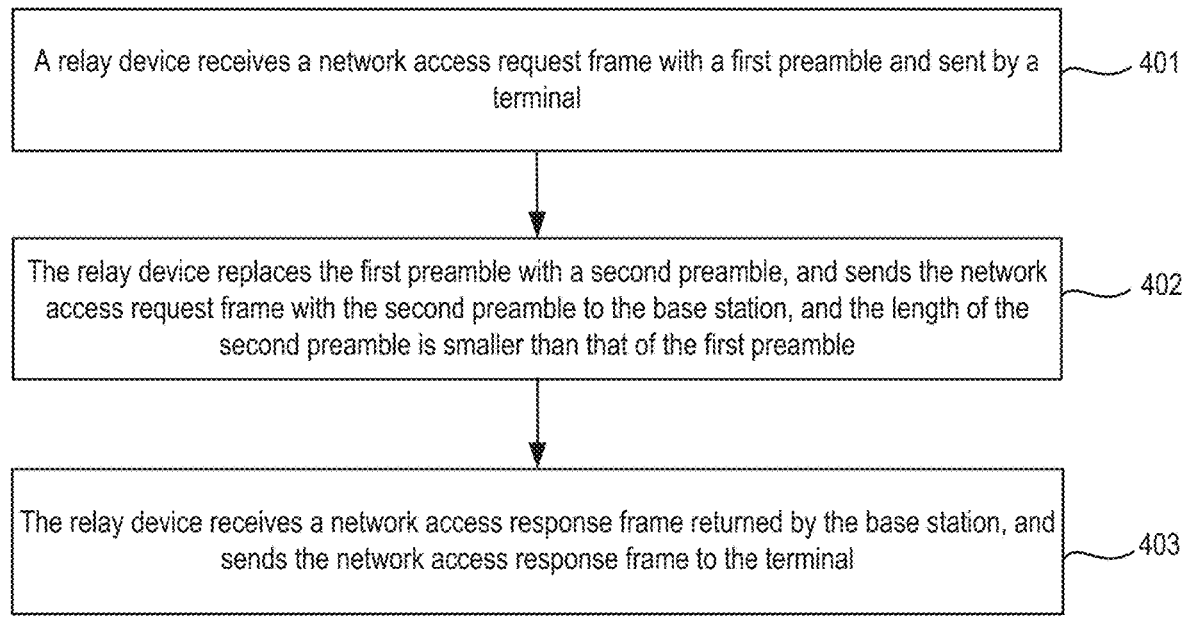
FIG. 4 is a flowchart of an example method of communication between a terminal and a base station, consistent with some embodiments of the present disclosure.

FIG. 4 shows a flowchart of an example method of communication between a terminal and a base station according to the present application. The method may include the following steps.

In some embodiments, in step 401, a relay device can receive a network access request frame with a first preamble sent by the terminal.

In some embodiments of the present application, a LoRa relay device is arranged between the terminal and the base station, and communication between the terminal and the base station may be established through the LoRa relay device.

After a standard network access procedure fails, the terminal may initiate a network access procedure to the relay device. In some embodiments, the terminal first sends the network access request frame with the first preamble to the relay device.

In some embodiments of the present application, the relay device may have a channel activity detection (CAD) mode.

In some embodiments, the CAD mode aims to detect a LoRa preamble on a radio channel with a power consumption efficiency as high as possible. In the CAD mode, the relay device can quickly scan a frequency band to detect a preamble of a LoRa radio frame.

In some embodiments of the present application, step 401 may include the following sub-steps.

In some embodiments, in sub-step S61, the delay device periodically wakes up from an intermittent sleep state, and detects whether there is a first preamble during the wake-up.

In some embodiments, in sub-step S62, if a first preamble is detected, the relay device receives the network access request frame after the first preamble.

In some embodiments of the present application, the relay device serves as a standard node that first accesses the LoRa network according to a standard network access procedure. That is, the relay device first sends a network access request frame with a second preamble to the base station, and then receives a network access response frame returned by the base station. After the standard network access is successful, the relay device can enter an intermittent sleep state to reduce power consumption.

In some embodiments of the present application, the relay device periodically wakes up from the intermittent sleep state, and detects whether there is a first preamble during the wake-up. If a first preamble is detected, the relay device can activate a data receiving function and receive a radio frame after the first preamble.

In some embodiments of the present application, a wake-up period of the relay device is smaller than the length of the first preamble, so that the first preamble will not be undetected when the relay device is woken up.

For example, the wake-up period of the relay device is 4 seconds. That is, the relay device is woken up every 4 seconds. The length of the first preamble can be greater than or equal to 4 seconds.

In some embodiments, in step 402, the relay device replaces the first preamble with a second preamble, and sends the network access request frame with the second preamble to the base station. In some embodiments, the length of the second preamble is smaller than that of the first preamble.

In some embodiments, in step 403, the relay device receives a network access response frame returned by the base station, and sends the network access response frame to the terminal.

In some embodiments, after receiving the network access request frame forwarded by the relay device, the base station returns a network access response frame to the relay device. The network access response frame also carries the second preamble, and the relay device receives the network access response frame according to the second preamble. Finally, the relay device returns the network access response frame with the second preamble to the terminal, and the terminal successfully accesses the network.

In some embodiments of the present application, the step of sending, by the relay device, the network access response frame to the terminal may include the following sub-steps.

In some embodiments, in sub-step S71, the relay device can send the network access response frame to the terminal within a second receiving window after the terminal sends the network access request frame with the first preamble.

In some embodiments, in sub-step S72, the relay device can enter the intermittent sleep state after sending the network access response frame to the terminal.

In some embodiments of the present application, the relay device is set to perform downlink transmission to the terminal within the second receiving window, after the terminal performs the uplink transmission. Therefore, the relay device sends the network access response frame to the terminal within the second receiving window after the terminal sends the network access request frame with the first preamble. In some embodiments, after sending the network access response frame, the relay device enters the intermittent sleep state and waits for the next wake-up.

In some embodiments of the present application, the relay device receives an uplink data frame with the first preamble from the terminal. After accessing the network through the relay device, the terminal sends the uplink data frame with the first preamble to the relay device.

In some embodiments of the present application, the step of receiving, by a relay device, an uplink data frame with a first preamble from the terminal may include the following sub-steps.

In some embodiments, in sub-step S81, the relay device periodically wakes from an intermittent sleep state, and detects whether there is a first preamble during the wake-up.

In some embodiments, in sub-step S82, if a first preamble is detected, relay device receives the uplink data frame after the first preamble.

In some embodiments of the present application, the method may further include: replacing, by the relay device, the first preamble with a second preamble, and sending the uplink data frame with the second preamble to the base station.

In some embodiments of the present application, the method may further include: receiving, by the relay device, a downlink data frame returned by the base station, and sending the downlink data frame to the terminal.

In some embodiments of the present application, the step of sending, by the relay device, the downlink data frame to the terminal may include the following sub-steps.

In some embodiments, in sub-step S91, the relay device sends the downlink data frame to the terminal within the second receiving window after the terminal sends the uplink data frame with the first preamble.

In some embodiments, in sub-step S92, the relay device enters the intermittent sleep state after sending the downlink data frame.

In some embodiments of the present application, the relay device can be set to perform downlink transmission to the terminal within the second receiving window after the terminal performs the uplink transmission. Therefore, the relay device sends the downlink data frame to the terminal within the second receiving window after the terminal sends the uplink data frame with the first preamble. After sending the downlink data frame, the relay device can enter the intermittent sleep state and wait for the next wake-up.

In some embodiments of the present application, a terminal may send a network access request frame with a first preamble to a relay device, and the relay device may forward the network access request frame to a base station. The relay device may then send a network access response frame returned by the base station to the terminal, thereby completing the network access process of the terminal.

In some embodiments, after the terminal accesses a network through the relay device, the terminal may send an uplink data frame with the first preamble to the relay device. The relay device may then forward the uplink data frame to the base station, and the relay device may send a downlink data frame returned by the base station to the terminal, thereby completing the process of communication between the terminal and the base station.

In some embodiments of the present application, the terminal may access a network through the relay device and communicate with the base station. In some embodiments of the present application, the LoRaWAN radio frame format for the wireless communication performed by the terminal is not changed. Meanwhile the length of a preamble may be increased. As such, the relay device does not adopt a private frame structure. Rather, the relay device is compatible with the LoRaWAN standard, thereby facilitating unification of the LoRa relay standard for all manufacturers.

In some embodiments, the network access procedure of a terminal is introduced from the perspective of a relay device.

Figure 5:
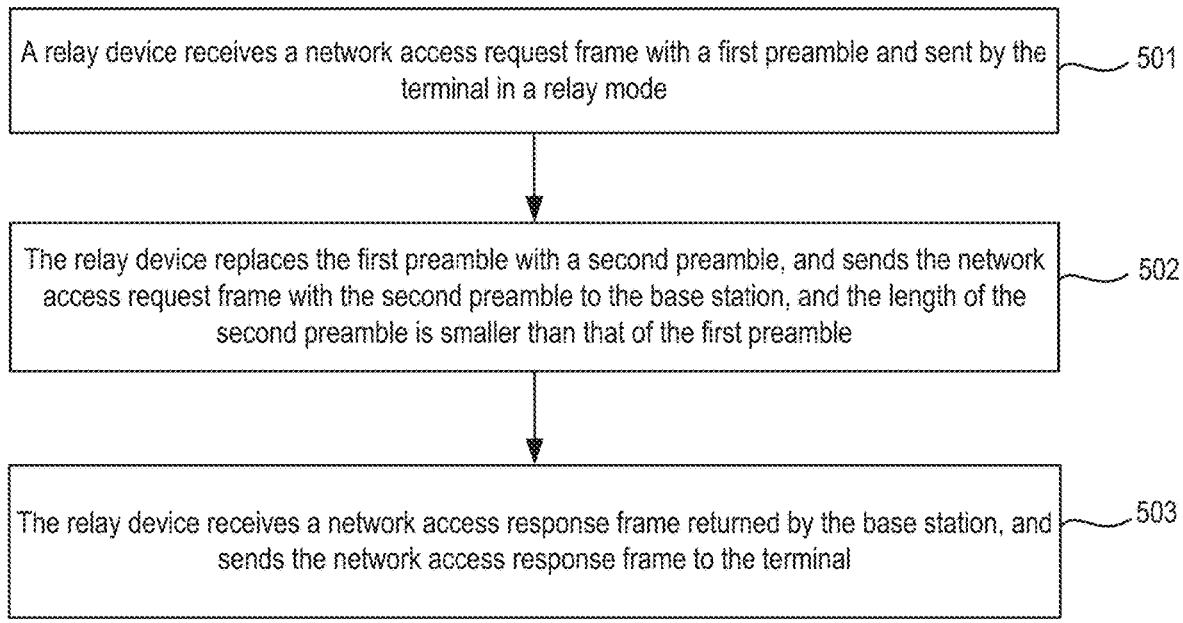
FIG. 5 is a flowchart of an example network access method of a terminal, consistent with some embodiments of the present disclosure.

FIG. 5 shows a flowchart of an example network access method of a terminal according to the present application.

In some embodiments, in step 501, a relay device receives a network access request frame with a first preamble that is sent by the terminal in a relay mode.

In some embodiments of the present application, the terminal has two working modes, including a normal mode and a relay mode. The terminal may initiate a network access procedure in the normal mode or the relay mode.

In some embodiments, when the terminal initiates the network access procedure in the relay mode, the terminal may first send a network access request frame with a first preamble to a relay. In some embodiments, the manner of sending the network access request may include broadcast, unicast, etc.

In some embodiments of the present application, step 501 may include the following sub-steps.

In some embodiments, in sub-step S1001, the relay device periodically wakes up from an intermittent sleep state, and detects whether there is a first preamble during the wake-up.

In some embodiments, in sub-step S1002, if a first preamble is detected, the relay device receives the network access request frame after the first preamble.

In some embodiments of the present application, a wake-up period of the relay device is shorter than the length of the first preamble, so that the first preamble will not be missed from detection when the relay device is woken up.

In some embodiments of the present application, the relay device periodically wakes up from the intermittent sleep state, and detects whether there is a first preamble during the wake-up. If a first preamble is detected, the relay device activates a data receiving function and receives a wireless frame after the first preamble.

In some embodiments of the present application, the relay device may have a CAD mode. In some embodiments, the CAD mode aims to detect a LoRa preamble on a radio channel with a power consumption efficiency as high as possible. In the CAD mode, the relay device quickly scans a frequency band to detect a preamble of a LoRa radio frame.

In some embodiments, in step 502, the relay device replaces the first preamble with a second preamble, and sends the network access request frame with the second preamble to the base station. In some embodiments, the length of the second preamble is smaller than that of the first preamble.

In some embodiments, in step 503, the relay device receives a network access response frame returned by the base station, and sends the network access response frame to the terminal.

In some embodiments of the present application, the step of sending, by the relay device, the network access response frame to the terminal may include the following sub-steps.

In some embodiments, in sub-step S1101, the relay device sends the network access response frame to the terminal within a second receiving window after the terminal sends the network access request frame with the first preamble.

In some embodiments, in sub-step S1102, relay device enters the intermittent sleep state after sending the network access response frame.

In some embodiments of the present application, a terminal may send a network access request frame with a first preamble to a relay device, and the relay device may forward the network access request frame to a base station. The relay device may send a network access response frame returned by the base station to the terminal, thereby completing the network access process of the terminal.

In some embodiments, the communication procedure of a terminal after network access is introduced from the perspective of a relay device.

Figure 6:
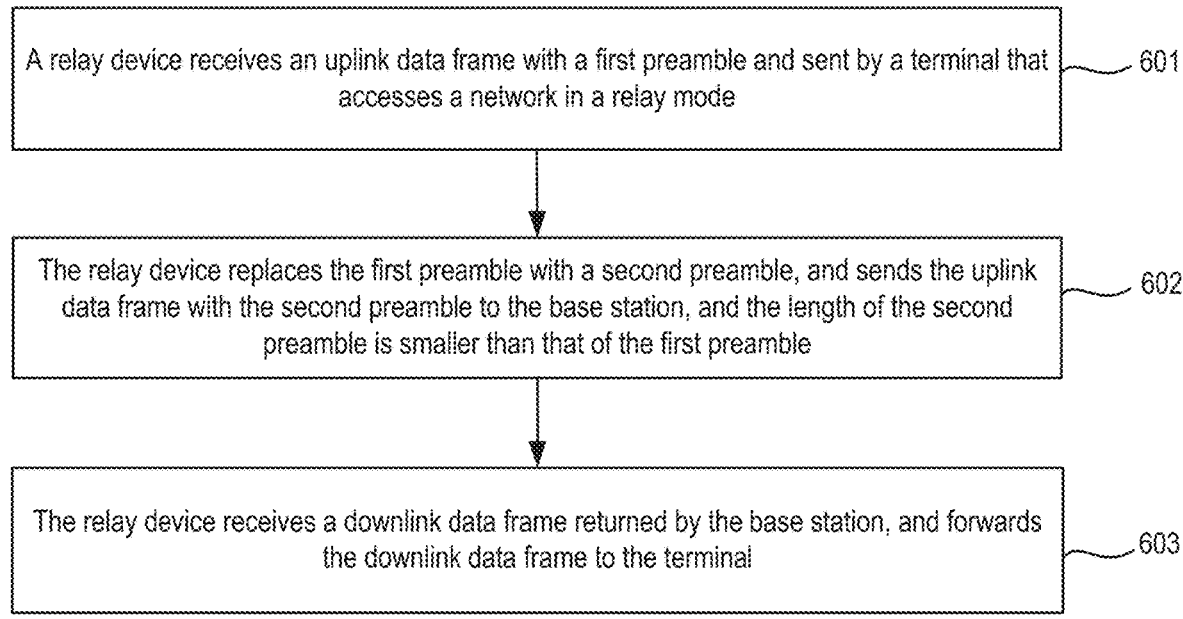
FIG. 6 is a flowchart of an example method of communication between a terminal and a base station, consistent with some embodiments of the present disclosure.

FIG. 6 shows a flowchart of an example method of communication between a terminal and a base station according to the present application.

In some embodiments, in step 601, a relay device receives an uplink data frame with a first preamble sent by the terminal that accesses a network in a relay mode.

In some embodiments of the present application, the terminal has two working modes, including a normal mode and a relay mode. The terminal may initiate a network access procedure in the normal mode or the relay mode.

In some embodiments, when the terminal has accessed a network in the relay mode, the terminal can add a first preamble before an uplink data frame in a data uplink manner, and then send the uplink data frame with the first preamble to the relay device.

In some embodiments of the present application, step 601 may include the following sub-steps.

In some embodiments, in sub-step S1201, the relay device periodically wakes up from an intermittent sleep state, and detects whether there is a first preamble during the wake-up.

In some embodiments, in sub-step S1202, if a first preamble is detected, the relay device receives the uplink data frame after the first preamble.

In some embodiments of the present application, a wake-up period of the relay device is shorter than the length of the first preamble.

In some embodiments of the present application, the relay device may have a CAD mode.

In some embodiments, the CAD mode aims to detect a LoRa preamble on a radio channel with as high power consumption efficiency as possible. In the CAD mode, the relay device can quickly scan a frequency band to detect a preamble of a LoRa radio frame.

In some embodiments of the present application, the relay device periodically wakes up from the intermittent sleep state, and detects whether there is a first preamble during the wake-up. In some embodiments, if a first preamble is detected, the relay device activates a data receiving function and receives a radio frame after the first preamble.

In some embodiments, in step 602, the relay device replaces the first preamble with a second preamble, and sends the uplink data frame with the second preamble to the base station. In some embodiments, the length of the second preamble is shorter than that of the first preamble.

In some embodiments, after receiving the uplink data frame, the relay device replaces the first preamble with a second preamble, and forwards the uplink data frame with the second preamble to the base station.

In some embodiments, in step 603, the relay device receives a downlink data frame returned by the base station, and forwards the downlink data frame to the terminal.

In some embodiments of the present application, step 603 may include the following sub-steps.

In some embodiments, in sub-step S1301, the relay device sends the downlink data frame to the terminal within the second receiving window after the terminal sends the uplink data frame with the first preamble.

In some embodiments, in sub-step S1302, the relay device enters the intermittent sleep state after sending the downlink data frame.

In some embodiments of the present application, the relay device is set to perform downlink transmission to the terminal within the second receiving window after the terminal performs the uplink transmission. Therefore, the relay device sends the downlink data frame to the terminal within the second receiving window after the terminal sends the uplink data frame with the first preamble. In some embodiments, after sending the downlink data frame, the relay device enters the intermittent sleep state and waits for the next wake-up. In some embodiments of the present application, after the terminal accesses a network through the relay device, the terminal may send an uplink data frame with the first preamble to the relay device. The relay device may forward the uplink data frame to the base station, and the relay device may send a downlink data frame returned by the base station to the terminal, thereby completing the process of communication between the terminal and the base station.

Figure 7:
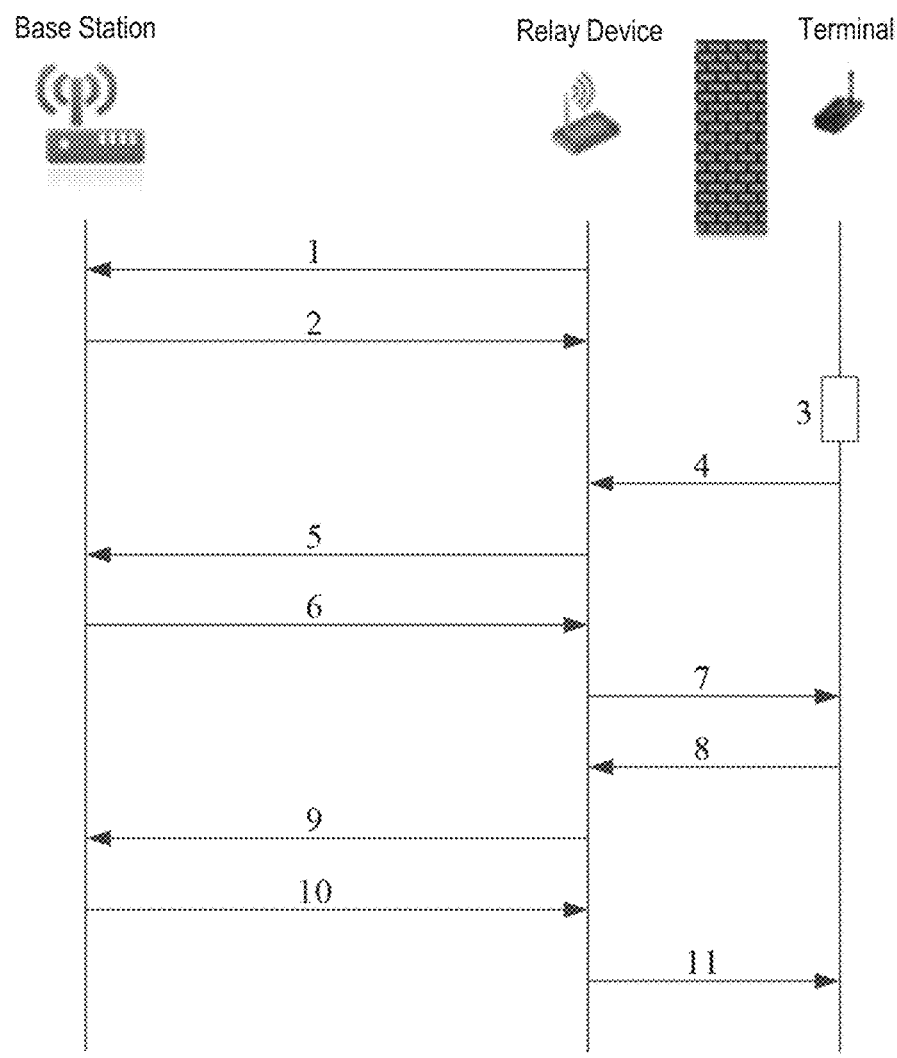
FIG. 7 is a flowchart of an example communication process between a terminal and a base station, consistent with some embodiments of the present disclosure.

FIG. 7 shows a flowchart of an example communication process between a terminal and a base station according to some embodiments of the present application. In some embodiments, in step 1, as a standard node, a LoRa relay device sends a network access request frame to a LoRa base station. In step 2, as the standard node, a LoRa relay receives a network access determination frame returned by the LoRa base station, and then enters an intermittent sleep state. In step 3, when a LoRa terminal sends the network access request frame with a second preamble in a normal mode, but does not receive a network access response frame, it is determined that the standard network access procedure fails.

In step 4, the LoRa terminal switches to a relay mode and sends the network access request frame with a first preamble in the relay mode. In step 5, the LoRa relay device is activated by the first preamble and receives the network access request frame. The relay device replaces the first preamble with the second preamble, and then forwards the network access request frame with the second preamble to the LoRa base station. In step 6, the LoRa relay device receives the network access response frame returned by the LoRa base station. In step 7, the LoRa relay device forwards a network access confirmation frame to the LoRa terminal in the relay mode within an RX2 window, and then enters an intermittent sleep state. In step 8, the LoRa terminal sends an uplink data frame with the first preamble in the relay mode. In step 9, the LoRa relay device is activated by the first preamble and receives the uplink data frame, replaces the first preamble with the second preamble, and then forwards the uplink data frame with the second preamble to the LoRa base station. In step 10, the LoRa relay device receives the downlink data frame returned by the LoRa base station. In step 11, the LoRa relay device forwards the downlink data frame to the LoRa terminal in the relay mode within the RX2 window, and then enters the intermittent sleep state, waiting for the next activation.

Embodiments in the present disclosure have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Figure 8:
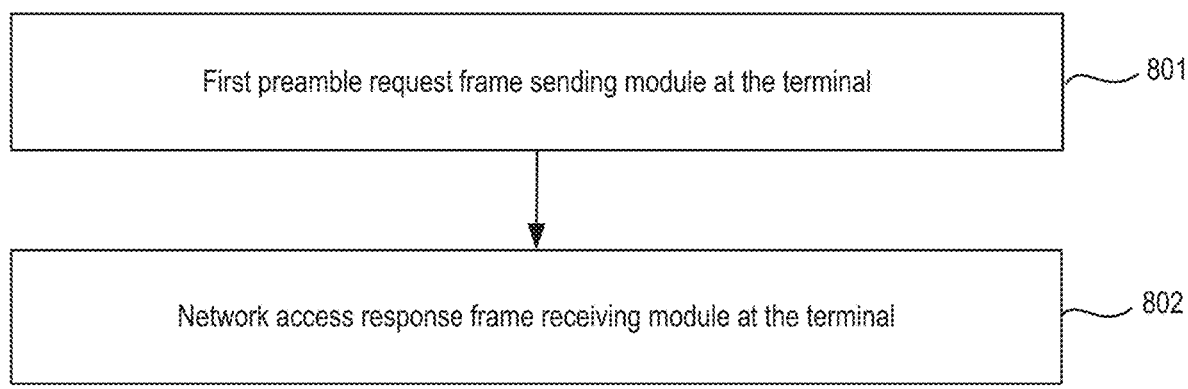
FIG. 8 is a structural block diagram of an example apparatus at a terminal in communication with a base station, consistent with some embodiments of the present disclosure.

FIG. 8 shows a structural block diagram of an example apparatus of a terminal in communication with a base station, according to some embodiments of the present application. In some embodiments, the apparatus may include a first preamble request frame sending module 801 at the terminal, configured to send a network access request frame with a first preamble to a relay device. In some embodiments, the relay device is configured to receive the network access request frame according to the first preamble, send the network access request frame with a second preamble to the base station, and receive a network access response frame returned by the base station. In some embodiments, the length of the second preamble is shorter than that of the first preamble. In some embodiments, the apparatus may further include a network access response frame receiving module 802 at the terminal, configured to receive the network access response frame sent by the relay device.

In some embodiments of the present application, the apparatus may further include: a first preamble data frame sending module at the terminal, configured to send an uplink data frame with the first preamble to the relay device. The relay device can be further configured to receive the uplink data frame according to the first preamble, send the uplink data frame with a second preamble to the base station, and receive a downlink data frame returned by the base station. In some embodiments, the apparatus may further include a downlink data frame receiving module at the terminal, configured to receive the downlink data frame sent by the relay device.

In some embodiments of the present application, the first preamble request frame sending module 801 may include: a first preamble request frame sending sub-module configured to send, by the terminal, the network access request frame with the first preamble to the relay device, when the terminal does not receive the network access response frame within a first receiving window or a second receiving window after sending the network access request frame with the second preamble. In some embodiments, the first preamble request frame sending module may include a second preamble request frame sending sub-module configured to send, by the terminal, the network access request frame with the first preamble to the relay device, when the terminal receives the network access response frame within a second receiving window after sending the network access request frame with the second preamble.

In some embodiments of the present application, the apparatus may further include a third preamble request frame sending module at the terminal, configured to send a network access request frame with a second preamble to the base station, when the terminal receives a network access request frame within a first receiving window after sending the network access request frame with the first preamble.

In some embodiments of the present application, the apparatus may further include a fourth preamble request frame sending module at the terminal, configured to send the network access request frame with the second preamble to the base station, when the terminal does not receive the network access request frame within the first receiving window or a second receiving window after sending the network access request frame with the first preamble.

In some embodiments of the present application, the network access response frame receiving module 802 may include: a network access response frame receiving sub-module configured to receive the network access response frame sent by the relay device within a second receiving window after the terminal sends the network access request frame with the first preamble.

In some embodiments of the present application, the downlink data frame receiving module may include: a downlink data frame receiving sub-module configured to receive the downlink data frame sent by the relay device within a second receiving window after the terminal sends the uplink data frame with the first preamble.

Figure 9:
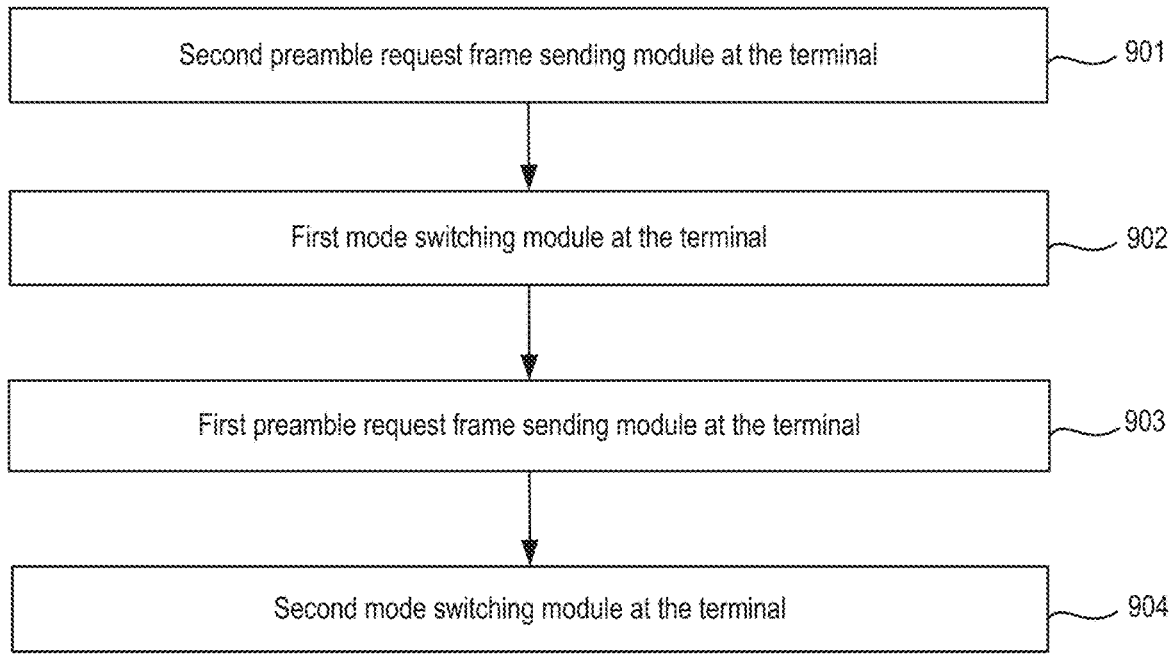
FIG. 9 is a structural block diagram of an example network access apparatus of a terminal, consistent with some embodiments of the present disclosure.

FIG. 9 shows a structural block diagram of an example network access apparatus of a terminal, according to some embodiments of the present application. In some embodiments, the apparatus may include a second preamble request frame sending module 901 at the terminal, configured to send a network access request frame with a second preamble in a normal mode; a first mode switching module 902 at the terminal, configured to switch from the normal mode to a relay mode, if the terminal receives a network access response frame within a second receiving window after sending the network access request frame with the second preamble; a first preamble request frame sending module 903 at the terminal, configured to send a network access request frame with a first preamble in the relay mode, where the length of the second preamble is shorter than that of the first preamble; and a second mode switching module 904 at the terminal, configured to switch from the relay mode to the normal mode, if the terminal receives a network access response frame within a first receiving window after sending the network access request frame with the first preamble, or if the terminal does not receive a network access response frame within a first receiving window or a second receiving window after sending the network access request frame with the first preamble.

In some embodiments of the present application, the apparatus may further include a first network access response frame receiving module at the terminal, configured to receive the network access response frame within a first receiving window after sending the network access request frame with the second preamble, so as to access a network in the normal mode.

In some embodiments of the present application, the apparatus may further include a first network access response frame receiving module at the terminal, configured to receive the network access response frame within the second receiving window after sending the network access request frame with the first preamble, so as to access a network in the relay mode.

Figure 10:
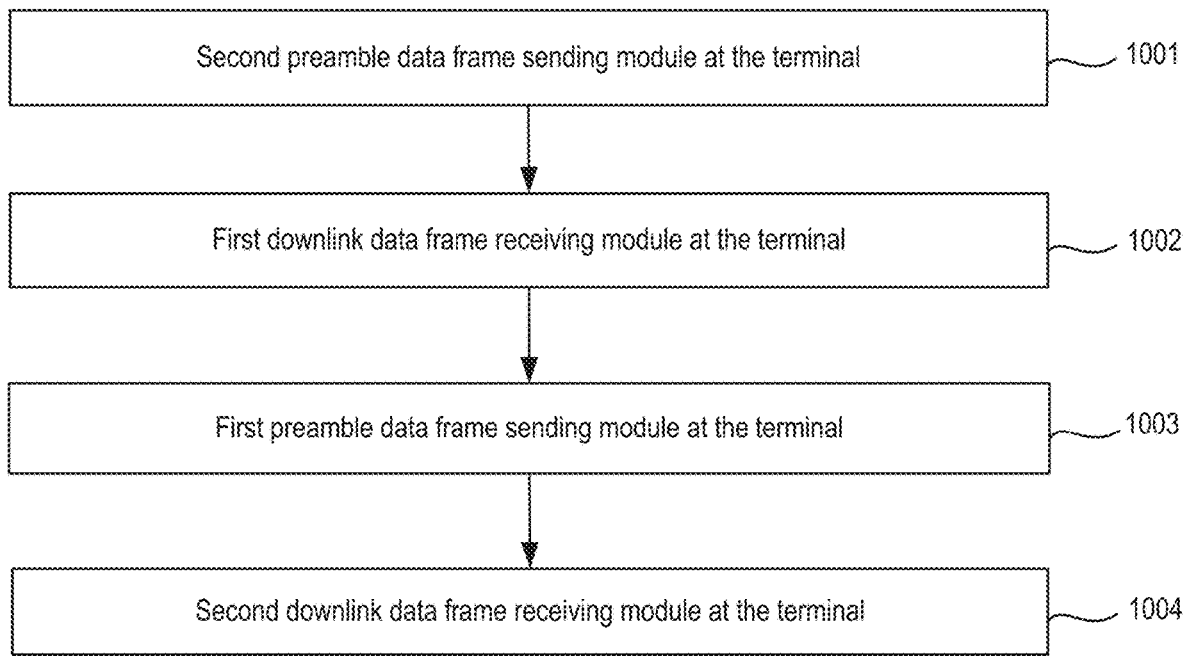
FIG. 10 is a structural block diagram of an example apparatus of a terminal in communication with a base station, consistent with some embodiments of the present disclosure.

FIG. 10 shows a structural block diagram of an example apparatus of a terminal in communication with a base station, according to some embodiments of the present application. In some embodiments, the apparatus may include a second preamble data frame sending module 1001 at the terminal, configured to send, when the terminal accesses a network in a normal mode, an uplink data frame with a second preamble to the base station in the normal mode; a first downlink data frame receiving module 1002 at the terminal, configured to receive a downlink data frame returned by the base station; and a first preamble data frame sending module 1003 at the terminal, configured to send, when the terminal accesses a network in a relay mode, an uplink data frame with a first preamble to a relay device in the relay mode. In some embodiments, the relay device is configured to replace the first preamble with a second preamble and forward the uplink data frame with the second preamble to the base station. The length of the second preamble may be shorter than that of the first preamble. The apparatus may further include a second downlink data frame receiving module 1004 at the terminal, configured to receive a downlink data frame returned by the base station and forwarded to the terminal by the relay device.

In some embodiments of the present application, the first downlink data frame receiving module 1002 may include a first downlink data frame receiving sub-module configured to receive the downlink data frame returned by the base station within a first receiving window after the terminal sends the uplink data frame with the second preamble.

In some embodiments of the present application, the second downlink data frame receiving module 1004 may include a second downlink data frame receiving sub-module configured to receive the downlink data frame that is returned by the base station and forwarded by the relay device within a second receiving window after the terminal sends the uplink data frame with the first preamble.

Figure 11:
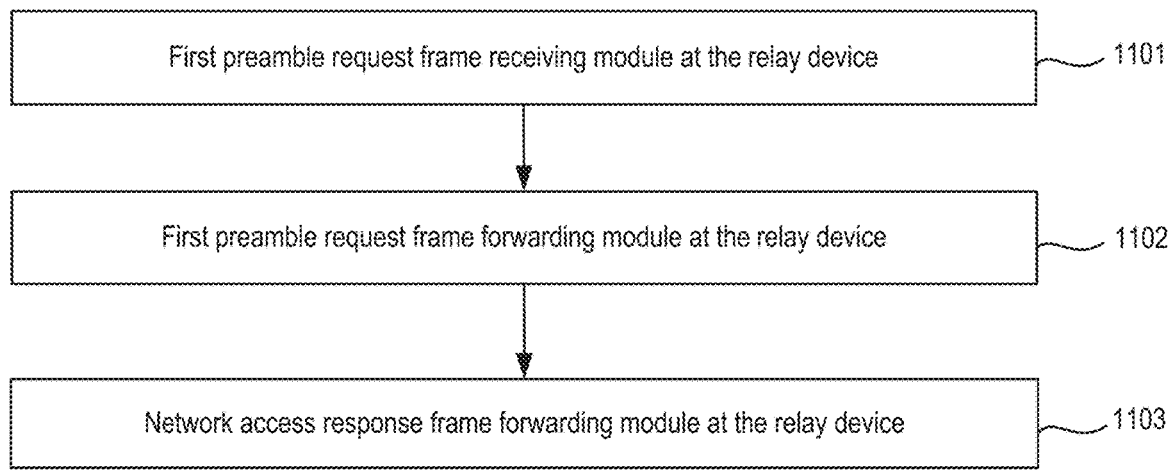
FIG. 11 is a structural block diagram of an example apparatus of a relay device in communication between a terminal and a base station, consistent with some embodiments of the present disclosure.

FIG. 11 shows a structural block diagram of an example apparatus of a relay device in communication between a terminal and a base station, according to some embodiments of the present application. In some embodiments, the apparatus may include a first preamble request frame receiving module 1101 at a relay device, configured to receive a network access request frame with a first preamble and sent by the terminal; a first preamble request frame forwarding module 1102 at the relay device, configured to replace the first preamble with a second preamble, and send the network access request frame with the second preamble to the base station, where the length of the second preamble is shorter than that of the first preamble; and a network access response frame forwarding module 1103 at the relay device, configured to receive a network access response frame returned by the base station, and send the network access response frame to the terminal.

In some embodiments of the present application, the apparatus may further include a first preamble data frame receiving module at the relay device, configured to receive an uplink data frame with a first preamble and sent by the terminal; a first preamble data frame forwarding module at the relay device, configured to replace the first preamble with a second preamble, and send the uplink data frame with the second preamble to the base station; and a downlink data frame forwarding module at the relay device, configured to receive a downlink data frame returned by the base station, and send the downlink data frame to the terminal.

In some embodiments of the present application, the first preamble request frame receiving module 1101 may include: a first preamble detection sub-module configured to periodically wake up from an intermittent sleep state, and detect whether there is a first preamble during the wake-up; and a first preamble request frame receiving sub-module configured to receive, when a first preamble is detected, the network access request frame after the first preamble.

In some embodiments of the present application, the network access response frame forwarding module 1103 may include: a network access response frame forwarding sub-module configured to send the network access response frame to the terminal within a second receiving window after the terminal sends the network access request frame with the first preamble; and a first sleep sub-module configured to enter the intermittent sleep state after sending the network access response frame.

In some embodiments of the present application, the first preamble data frame receiving module may include a second preamble detection sub-module configured to periodically wake up from an intermittent sleep state, and detect whether there is a first preamble during the wake-up; and a first preamble data frame receiving sub-module configured to receive, when a first preamble is detected, the uplink data frame after the first preamble.

In some embodiments of the present application, the downlink data frame forwarding module may include a downlink data frame forwarding sub-module configured to send the downlink data frame to the terminal within a second receiving window after the terminal sends the uplink data frame with the first preamble; and a second sleep sub-module configured to enter the intermittent sleep state after sending the downlink data frame.

In some embodiments of the present application, a wake-up period of the relay device is shorter than the length of the first preamble.

Figure 12:
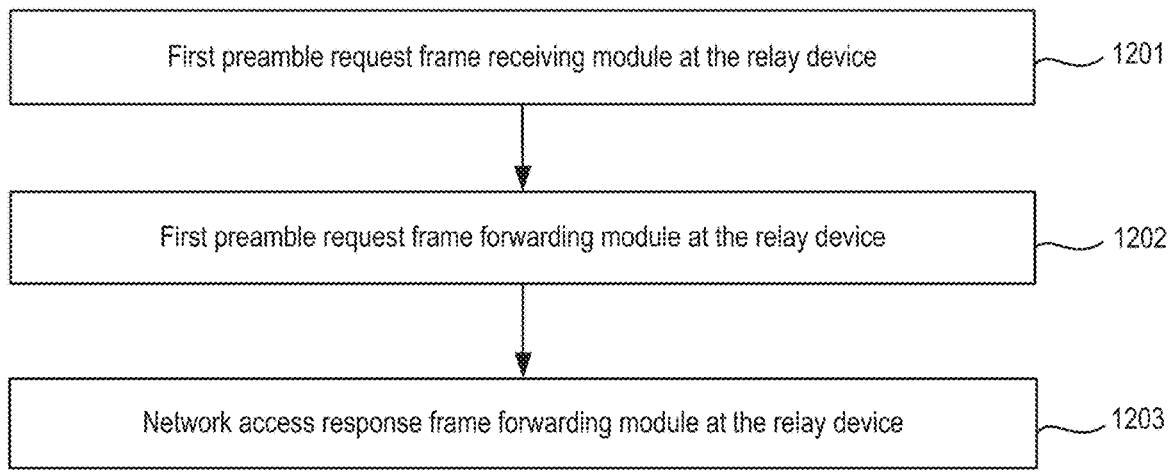
FIG. 12 is a structural block diagram of an example apparatus facilitating the network access of a terminal, consistent with some embodiments of the present disclosure.

FIG. 12 shows a structural block diagram of an example apparatus facilitating the network access of a terminal, according to some embodiments of the present application. In some embodiments, the apparatus may include a first preamble request frame receiving module 1201 at a relay device, configured to receive a network access request frame with a first preamble sent by the terminal in a relay mode; a first preamble request frame forwarding module 1202 at the relay device, configured to replace the first preamble with a second preamble, and send the network access request frame with the second preamble to the base station, where the length of the second preamble is shorter than that of the first preamble; and a network access response frame forwarding module 1203 at the relay device, configured to receive a network access response frame returned by the base station, and send the network access response frame to the terminal.

In some embodiments of the present application, the first preamble request frame receiving module 1201 may include: a first preamble detection sub-module configured to periodically wake up from an intermittent sleep state, and detect whether there is a first preamble during the wake-up; and a first preamble request frame receiving sub-module configured to receive, when a first preamble is detected, the network access request frame after the first preamble by the relay device.

In some embodiments of the present application, the network access response frame forwarding module 1203 may include: a network access response frame forwarding sub-module configured to send the network access response frame to the terminal within a second receiving window after the terminal sends the network access request frame with the first preamble; and a sleep sub-module configured to enter the intermittent sleep state after sending the network access response frame.

In some embodiments of the present application, a wake-up period of the relay device is shorter than the length of the first preamble.

Figure 13:
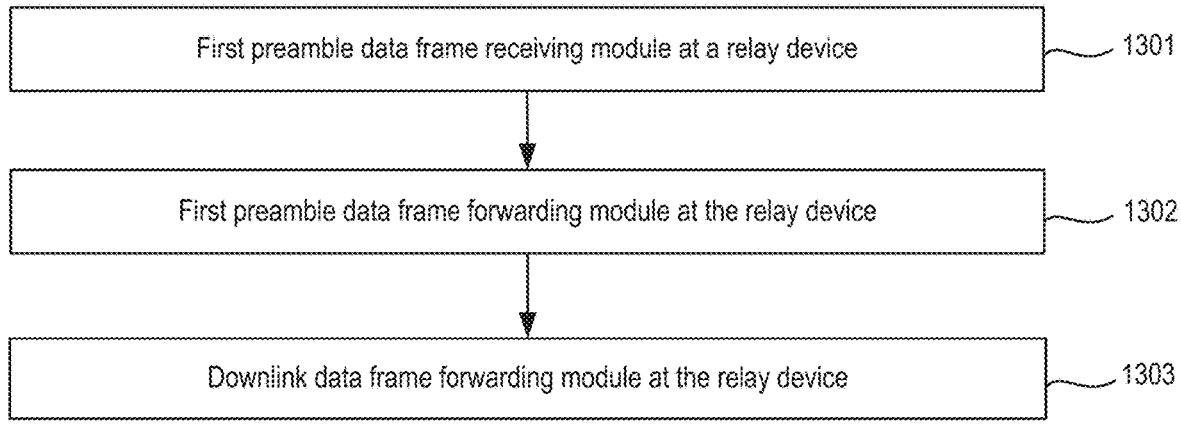
FIG. 13 is a structural block diagram of an apparatus of communication between a terminal and a base station, consistent with some embodiments of the present disclosure.

FIG. 13 shows a structural block diagram of an apparatus of communication between a terminal and a base station, according to some embodiments of the present application. In some embodiments, the apparatus may include a first preamble data frame receiving module 1301 at a relay device, configured to receive an uplink data frame with a first preamble sent by the terminal that accesses a network in a relay mode; a first preamble data frame forwarding module 1302 at the relay device, configured to replace the first preamble with a second preamble and send the uplink data frame with the second preamble to the base station, where the length of the second preamble is shorter than that of the first preamble; and a downlink data frame forwarding module 1303 at the relay device, configured to receive a downlink data frame returned by the base station, and forward the downlink data frame to the terminal.

In some embodiments of the present application, the first preamble data frame receiving module 1301 may include a first preamble detection sub-module configured to periodically wake up from an intermittent sleep state, and detect whether there is a first preamble during the wake-up; and a first preamble data frame receiving sub-module configured to receive, when a first preamble is detected, the uplink data frame after the first preamble by the relay device.

In some embodiments of the present application, the downlink data frame forwarding module 1303 may include: a downlink data frame forwarding sub-module configured to send the downlink data frame to the terminal within a second receiving window after the terminal sends the uplink data frame with the first preamble; and a sleep sub-module configured to enter the intermittent sleep state after the downlink data frame is sent.

In some embodiments of the present application, a wake-up period of the relay device is shorter than the length of the first preamble.

Figure 14:
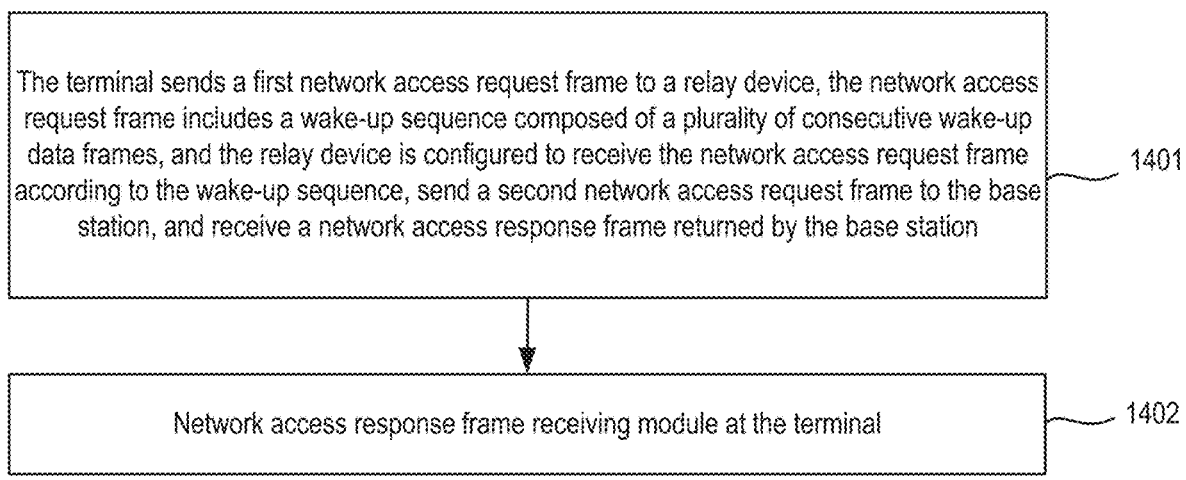
FIG. 14 is a flowchart of an example method for communication between a terminal and a base station, consistent with some embodiments of the present disclosure.

FIG. 14 shows a flowchart of an example method for communication between a terminal and a base station, according to some embodiments of the present application. In some embodiments, the method may include the following steps.

In step 1401, the terminal sends a first network access request frame to a relay device, where the first network access request frame includes a wake-up sequence composed of a plurality of consecutive wake-up data frames. The relay device can be configured to receive the network access request frame according to the wake-up sequence, send a second network access request frame to the base station, and receive a network access response frame returned by the base station.

In some embodiments, the first network access request frame is a network access request frame including a wake-up sequence. In some embodiments, the wake-up data frame can be a small data frame. In some embodiments, the wake-up data frame can also be a wake-up data packet. The wake-up sequence can be composed of a plurality of wake-up data frames connected end to end. For example, the wake-up sequence may be composed of 30 wake-up data frames connected end to end. In some embodiments, there is no idle time slot between two adjacent wake-up data frames. In some embodiments, in order to cause the awakened relay device to better receive the wake-up data frame, there can be an idle time slot between two adjacent wake-up data frames. The idle time slots between every two adjacent wake-up data frames can be equal. Considering factors such as balance duration and signal sensitivity, the wake-up data frame can have a spreading factor of 9. In some embodiments, the wake-up sequence may or may not include a preamble. The preamble may be a second preamble. In some embodiments, the second network access request frame is a network access request frame that includes the preamble but does not include the wake-up sequence. The preamble in the second network access request frame may have a normal length. In some embodiments, the preamble in the second network access request may be the second preamble.

In step 1402, the terminal receives the network access response frame sent by the relay device.

In some embodiments, the relay device receives a network access response frame corresponding to the second network access request frame sent by the base station, and sends the network access response frame to the terminal.

In some embodiments of the present application, the wake-up data frame includes a first count value and a terminal identifier, where the first count value is used to cause the relay device to acquire information about the number of remaining wake-up data frames in the wake-up sequence.

In some embodiments, the first count value carries information about the number of wake-up data frames after the wake-up data frame. For example, if the relay device parses out that the first count value carried in a certain wake-up data frame is 7, it means that there are 6 wake-up data frames after the wake-up data frame. The relay device may calculate, according to sending duration information of each wake-up data frame and information about the number of wake-up data frames, the time for performing the next wake-up and receiving a data payload part of a network access request frame, or the time for performing the next wake-up and receiving a data payload part of an uplink data frame. In some embodiments, the first count value may also be used to cause the relay device to acquire time information about the next wake-up. A terminal identifier may be a device extended unique identifier (DevEUI), or a device address (DevAddr) obtained by the terminal, or may include both DevEUI and DevAddr. The relay device can parse out the terminal identifier in the wake-up data frame, and determine whether the terminal identifier exists in a service whitelist. In some embodiments, when the terminal identifier exists in a service whitelist, the relay device sends the second network access request frame or the uplink data frame to the base station. In some embodiments, when the terminal identifier does not exist in a service whitelist, the second network access request frame is not sent. The terminal identifier included in the wake-up data frame in the first network access request frame sent by the terminal may be DevEUI. The terminal identifier included in the wake-up data frame in the uplink data frame sent by the terminal may be DevEUI, DevAddr, or both. In some embodiments, the service whitelist includes at least one terminal identifier. The service whitelist can be used to record terminal identifiers of terminals that can be served by the relay device. The service whitelist may be preset in the relay device. In some embodiments, after receiving the network access response frame, the terminal may send at least one of DevEUI and DevAddr to the service whitelist. The service whitelist may update at least one of DevEUI and DevAddr according to a message received from the terminal. In some embodiments, the service whitelist can also be configured through a media access control (MAC) command issued by a network server. For example, the network server may issue a whitelist configuration command (WhiteListConfig Command) to the relay device through the base station. In some embodiments, the whitelist configuration command includes a terminal identifier to be deleted or added. After receiving the whitelist configuration command, the relay device can delete or add the corresponding terminal identifier according to the configuration command. The terminal identifier may include at least one of DevEUI and DevAddr.

In the embodiments of the present application, the method may further include: encrypting the wake-up data frame by a wake-up session key. The wake-up session key can be used to cause the relay device to decrypt the wake-up data frame with the wake-up session key when the relay device receives the wake-up data frame in an awake state.

In some embodiments, the wake-up session key may be preset in the terminal and the relay device. In some embodiments, the wake-up session key may also be dynamically generated according to a root key existing in the terminal and the relay device.

In some embodiments of the present application, the relay device may be woken up to receive a wake-up data frame, and receive a subsequent data load part according to information in the wake-up data frame, so as to reduce the power consumption impact caused by a distributed denial of service (DDoS) attack, and improve the battery efficiency of the relay device.

Figure 15:
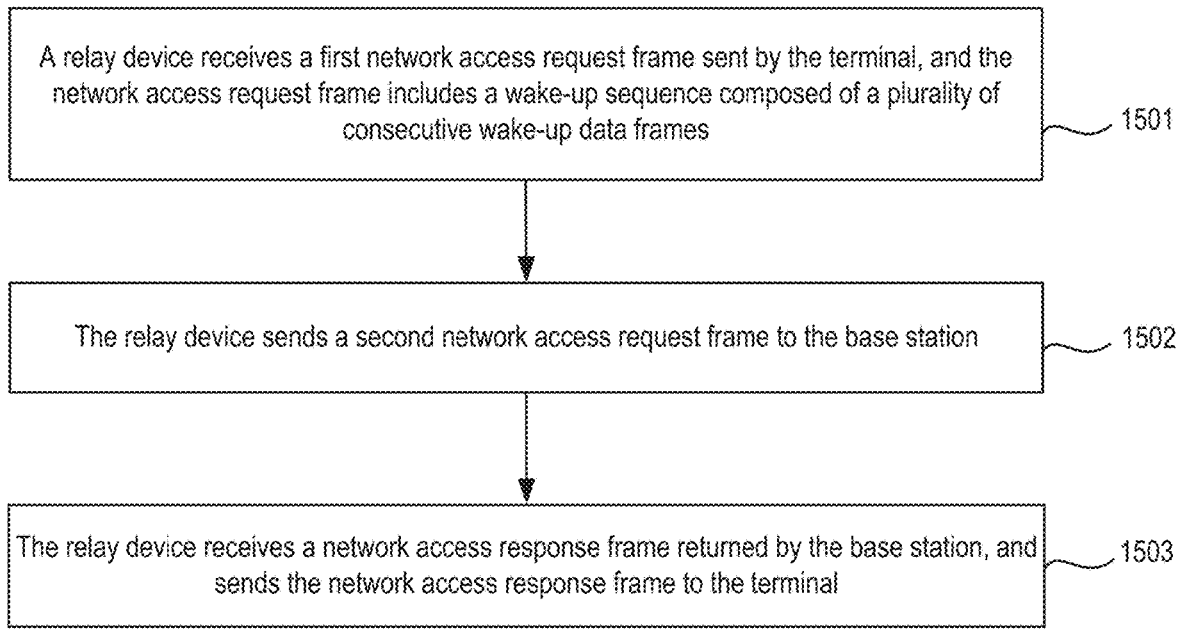
FIG. 15 is a flowchart of an example method for communication between a terminal and a base station, consistent with some embodiments of the present disclosure.

FIG. 15 shows a flowchart of a method of communication between a terminal and a base station, according to some embodiments of the present application. In some embodiments, the method includes the following steps.

In step 1501, a relay device receives a first network access request frame sent by the terminal. The network access request frame may include a wake-up sequence composed of a plurality of consecutive wake-up data frames.

In some embodiments, the first network access request frame includes a wake-up sequence. In some embodiments, the wake-up data frame is a small data frame. In some embodiments, the wake-up data frame can also be a wake-up data packet. The wake-up sequence can be composed of a plurality of wake-up data frames connected end to end. For example, the wake-up sequence may be composed of 30 wake-up data frames connected end to end. In some embodiments, there is no idle time slot between two adjacent wake-up data frames. In some embodiments, in order to cause the awakened relay device to better receive the wake-up data frame, there can be an idle time slot between two adjacent wake-up data frames. The idle time slots between every two adjacent wake-up data frames can be equal. In some embodiments, the wake-up sequence may or may not include a preamble. The preamble may be a second preamble.

In step 1502, the relay device sends a second network access request frame to the base station.

In some embodiments, the second network access request frame is a network access request frame that includes a preamble but does not include a wake-up sequence.

In step 1503, the relay device receives a network access response frame returned by the base station, and sends the network access response frame to the terminal.

In some embodiments, the relay device receives a network access response frame corresponding to the second network access request frame sent by the base station, and sends the network access response frame to the terminal.

In some embodiments of the present application, the wake-up data frame includes a first count value and a terminal identifier, where the first count value is used to cause the relay device to acquire information about the number of remaining wake-up data frames in the wake-up sequence.

In some embodiments, the first count value carries information about the number of wake-up data frames after the wake-up data frame. For example, if the relay device parses out that the first count value carried in a certain wake-up data frame is 7, it means that there are 6 wake-up data frames after the wake-up data frame. The relay device may calculate, according to sending duration information of each wake-up data frame plus information about the number of wake-up data frames, the time for performing the next wake-up and receiving a data payload part of a network access request frame, or the time for performing the next wake-up and receiving a data payload part of an uplink data frame. In some embodiments, the first count value may also be used to cause the relay device to acquire time information about the next wake-up. In some embodiments, the terminal identifier may be a DevEUI. The relay device can parse out the terminal identifier in the wake-up data frame, and determine whether the terminal identifier exists in a service whitelist. In some embodiments, when the terminal identifier exists in the service whitelist, the relay device sends the second network access request frame to the base station. In some embodiments, when the terminal identifier does not exist in a service whitelist, the second network access request frame is not sent. The service whitelist includes at least one terminal identifier. The service whitelist is used to record terminal identifiers of terminals that may be served by the relay device. The service whitelist may be preset in the relay device. In some embodiments, the service whitelist can also be configured through a MAC command issued by a network server. For example, the network server may issue a whitelist configuration command (WhiteListConfig Command) to the relay device through the base station. In some embodiments, the whitelist configuration command includes a terminal identifier to be deleted or added. After receiving the whitelist configuration command, the relay device can delete or add the corresponding terminal identifier according to the configuration command.

In some embodiments of the present application, the method may further include: encrypting the wake-up data frame by a wake-up session key. The wake-up session key can be used to cause the relay device to decrypt the wake-up data frame with the wake-up session key when the relay device receives the wake-up data frame in an awake state.

In some embodiments, the wake-up session key may be preset in the terminal and the relay device. In some embodiments, the wake-up session key may also be dynamically generated according to a root key existing in the terminal and the relay device.

In some embodiments of the present application, the relay device may be woken up to receive a wake-up data frame, and receive a subsequent data load part according to information in the wake-up data frame, so as to reduce the power consumption impact caused by a distributed denial of service (DDoS) attack, and improve the battery efficiency of the relay device.

Figure 16:
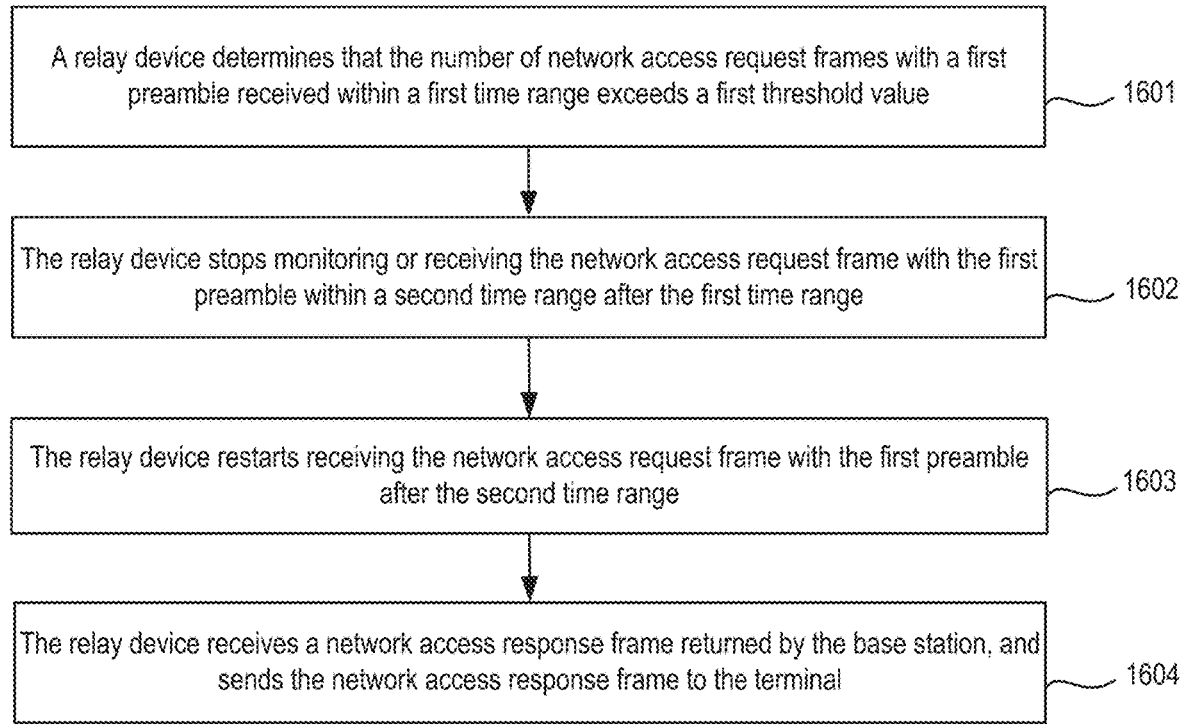
FIG. 16 is a flowchart of an example method for communication between a terminal and a base station, consistent with some embodiments of the present disclosure.

FIG. 16 shows a flowchart of an example method for communication between a terminal and a base station according to some embodiments of the present application. The method may specifically include the following steps.

In step 1601, a relay device can determine that the number of network access request frames with a first preamble received within a first time range exceeds a first threshold value.

In some embodiments, the first time range may be a preset time interval range, such as one minute, 2 minutes, or 1 minute and 30 seconds, etc. In some embodiments, the length of the first time range may also be configured through an MAC command issued by a network server. For example, the network server may issue a long preamble detection time configuration command to the relay device through the base station. The command may carry a new first time range. After receiving the long preamble detection time configuration command, the relay device can replace the old first time range with the new first time range. The first threshold value may be a number, such as 4 or 5.

In step 1602, the relay device can stop monitoring or receiving the network access request frame with the first preamble within a second time range after the first time range.

In some embodiments, the second time range may be a preset time interval range, such as 5 minutes, 6 minutes, or 5 minutes and 30 seconds, etc. The length of the second time range may also be configured through the MAC command issued by the network server. For example, the network server may issue a relay service suspension configuration command to the relay device through the base station. The command may carry a new second time range. After receiving the relay service suspension configuration command, the relay device may replace the old second time range with the new second time range. In some embodiments, when the relay device detects that a plurality of network access request frames with a first preamble are consecutively detected within a period of time (e.g., a first time range), and the number of network access request frames with the first preamble is larger than a first threshold value, such as 5, it is determined that there is a DDoS attack. Moreover, within another time range after the determined time point (e.g., a second time range, for example, of 10 minutes), the relay device stops monitoring or receiving the network access request frame with the first preamble. In some embodiments, when a long preamble is detected within the second time range, the relay device will continue to stay in the sleep state and no longer receive the subsequent data payload part.

In step 1603, the relay device restarts receiving the network access request frame with the first preamble after the second time range.

In some embodiments, the second time range may be different from the first time range. For example, the relay device may determine that up to 7 network access request frames with the first preamble are received within 2 minutes (e.g., the first time range). The first threshold value may be 6. Then, the relay device may stop monitoring or receive the network access request frame or the uplink data frame with the first preamble within the next 5 minutes (e.g., the second time range). In some embodiments, within the second time range, the relay device may detect that the number of network access request frames with the first preamble is smaller than a second threshold value. Accordingly, the relay device may restart receiving the network access request frame with the first preamble. The relay device may determine, within the second time range, whether the DDoS attack is alleviated by detecting that the network access request frame with a long preamble is smaller than a second threshold value. In accordance with determining that the DDoS attack is alleviated, the relay device will restart service after the second time range.

In step 1604, the relay device receives a network access response frame returned by the base station, and sends the network access response frame to the terminal.

In some embodiments of the present application, by determining that there is a DDoS attack from an attacker in a period of time, the relay device may temporarily stop monitoring or receiving network access request frames or uplink data frames with first preambles in the following period of time, and restart the relay service afterwards, so as to reduce the power consumption impact caused by the DDoS attack, and improve the battery efficiency of the relay device.

The embodiments of the present application also provide an apparatus, including:
one or more processors; and one or more machine-readable media having instructions stored thereon that, when executed by the one or more processors, cause the apparatus to perform the methods described in the embodiments of the present application.

The embodiments of the present application also provide one or more machine-readable media having instructions stored thereon that, when executed by one or more processors, cause an apparatus to perform the methods described in the embodiments of the present application.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Those skilled in the art should understand that the embodiments of the present application may be provided as a method, an apparatus, or a computer program product. Therefore, the embodiments of the present application may be in the form of a complete hardware embodiment, a complete software embodiment, or an embodiment combining software and hardware. Moreover, the embodiments of the present application may be in the form of a computer program product implemented on one or more computer-usable storage media (including, but not limited to, a magnetic disk memory, a CD-ROM, an optical memory, and the like) including computer-usable program code.

The embodiments of the present application are described with reference to flowcharts and/or block diagrams of methods, terminal devices (systems), and computer program products according to the embodiments of the present application. It should be understood that each flow and/or block in the flowcharts and/or block diagrams and a combination of flows and/or blocks in the flowcharts and/or block diagrams may be implemented by computer program instructions. These computer program instructions may be provided to a processor of a general-purpose computer, a special-purpose computer, an embedded processor, or another programmable data processing terminal device to produce a machine, so that the instructions executed by the processor of the computer or another programmable data processing terminal device produce an apparatus for realizing the functions specified in one or more flows of the flowcharts and/or one or more blocks of the block diagrams.

These computer program instructions may also be stored in a computer-readable memory that can direct a computer or another programmable data processing terminal device to work in a specific manner, so that the instructions stored in this computer-readable memory produce an article of manufacture including an instruction apparatus which implements the functions specified in one or more flows of the flowcharts and/or one or more blocks of the block diagrams.

These computer program instructions may also be loaded onto a computer or another programmable data processing terminal device, so that a series of operation steps are performed on the computer or another programmable terminal device to produce computer-implemented processing, so that the instructions executed on the computer or another programmable terminal device provide steps for implementing the functions specified in one or more flows of the flowcharts and/or one or more blocks of the block diagrams.

Although the preferred embodiments of the embodiments of the present application have been described, those skilled in the art can make additional changes and modifications to these embodiments once they learn the basic creative concept. Therefore, the appended claims are intended to be interpreted as including the preferred embodiments and all changes and modifications fall within the scope of the embodiments of the present application.

Finally, it should also be noted that relational terms such as first and second are used herein only to distinguish one entity or operation from another entity or operation without necessarily requiring or implying any such actual relationship or order between such entities or operations. Moreover, the terms "comprise," "include," or any other variations thereof are intended to cover non-exclusive inclusion, so that a process, method, article, or terminal device including a series of elements not only includes the elements, but also includes other elements not clearly listed, or further includes elements inherent to the process, method, article, or terminal device. In the absence of more limitations, an element defined by "including a/an . . . " does not exclude that the process, method, article, or terminal device including the element further has other identical elements.

A method of communication between a terminal and a base station, an apparatus of communication between a terminal and a base station, a network access method of a terminal, and a network access apparatus of a terminal provided by the present application are described above in detail. The principles and implementations of the present application are elaborated herein using specific examples, and the description of the above embodiments is intended merely to aid in the understanding of the methods and core concepts of the present application. Meanwhile, for those of ordinary skill in the art, there will be changes in specific implementations and the scope of application according to the idea of the present application. In summary, this specification should not be construed as limiting the present application.

The invention claimed is:

1. A method performed by a terminal for communication with a base station, comprising:
   sending, by the terminal, a network access request frame with a first preamble to a relay device, wherein the relay device is configured to receive the network access request frame according to the first preamble, send the network access request frame with a second preamble to the base station, and receive a network access response frame returned by the base station, the length of the second preamble being shorter than that of the first preamble;
   receiving, by the terminal, the network access response frame sent by the relay device; and
   in accordance with determining that the terminal does not receive the network access response frame within a first receiving window or a second receiving window after sending the network access request frame with the first preamble, sending, by the terminal, the network access request frame with the second preamble to the base station.

2. The method according to claim 1, further comprising:
   sending, by the terminal, an uplink data frame with the first preamble to the relay device, wherein the relay device is further configured to receive the uplink data frame according to the first preamble, send the uplink data frame with the second preamble to the base station, and receive a downlink data frame returned by the base station; and
   receiving, by the terminal, the downlink data frame sent by the relay device.

3. The method according to claim 1, wherein sending the network access request frame with the first preamble to the relay device further comprises:
   in accordance with determining that the terminal does not receive the network access response frame within a first receiving window or a second receiving window after sending the network access request frame with the second preamble, sending, by the terminal, the network access request frame with the first preamble to the relay device;
   or
   in accordance with determining that the terminal receives the network access response frame within the second receiving window after sending the network access request frame with the second preamble, sending, by the terminal, the network access request frame with the first preamble to the relay device.

4. The method according to claim 1, further comprising:
   in accordance with determining that the terminal receives the network access response frame within a first receiving window after sending the network access request frame with the first preamble, sending, by the terminal, the network access request frame with the second preamble to the base station.

5. The method according to claim 1, wherein receiving the network access response frame sent by the relay device further comprises:
   receiving, by the terminal, the network access response frame sent by the relay device within a second receiving window after sending the network access request frame with the first preamble.

6. The method according to claim 2, wherein receiving the downlink data frame sent by the relay device further comprises:
   receiving, by the terminal, the downlink data frame sent by the relay device within a second receiving window after sending the uplink data frame with the first preamble.

7. A terminal in communication with a base station, comprising:
   a memory storing a set of instructions; and
   one or more processors configured to execute the set of instructions to cause the apparatus to perform:
   sending a network access request frame with a first preamble to a relay device, wherein the relay device is configured to receive the network access request frame according to the first preamble, send the network access request frame with a second preamble to the base station, and receive a network access response frame returned by the base station, the length of the second preamble being shorter than that of the first preamble;

receiving the network access response frame sent by the relay device; and sending the network access request frame with the second preamble to the base station, in accordance with determining that the terminal does not receive the network access response frame within the first receiving window or a second receiving window after sending the network access request frame with the first preamble.

8. The terminal according to claim 7, wherein the memory further stores instructions that, when executed by the one or more processors, cause the terminal to perform:

sending an uplink data frame with the first preamble to the relay device, wherein the relay device is further configured to receive the uplink data frame according to the first preamble, send the uplink data frame with the second preamble to the base station, and receive a downlink data frame returned by the base station; and receiving the downlink data frame sent by the relay device.

9. The terminal according to claim 7, wherein sending the network access request frame with the first preamble to the relay device further comprises:

sending, by the terminal, the network access request frame with the first preamble to the relay device, in accordance with determining that the terminal does not receive the network access response frame within a first receiving window or a second receiving window after sending the network access request frame with the second preamble;

or sending, by the terminal, the network access request frame with the first preamble to the relay device, in accordance with determining that the terminal receives the network access response frame within the second receiving window after sending the network access request frame with the second preamble.

10. The terminal according to claim 7, wherein the memory further stores instructions that, when executed by the one or more processors, cause the terminal to perform:

sending the network access request frame with the second preamble to the base station, in accordance with determining that the terminal receives the network access response frame within a first receiving window after sending the network access request frame with the first preamble.

11. The terminal according to claim 7, wherein receiving the network access response frame sent by the relay device further comprises:

receiving the network access response frame sent by the relay device within a second receiving window after sending the network access request frame with the first preamble.

12. The terminal according to claim 8, wherein receiving the network access response frame sent by the relay device further comprises:

receiving the downlink data frame sent by the relay device within a second receiving window after sending the uplink data frame with the first preamble.

13. A non-transitory computer readable medium that stores a set of instructions that is executable by at least one processor of a computer to cause the computer to perform a method for communication between a terminal and a base station, the method comprising:

sending, by the terminal, a network access request frame with a first preamble to a relay device, wherein the relay device is configured to receive the network access request frame according to the first preamble, send the network access request frame with a second preamble to the base station, and receive a network access response frame returned by the base station, the length of the second preamble being shorter than that of the first preamble;

receiving, by the terminal, the network access response frame sent by the relay device; and in accordance with determining that the terminal does not receive the network access response frame within the first receiving window or a second receiving window after sending the network access request frame with the first preamble, sending, by the terminal, the network access request frame with the second preamble to the base station.

14. The non-transitory computer readable medium according to claim 13, wherein the method further comprises:

sending, by the terminal, an uplink data frame with the first preamble to the relay device, wherein the relay device is further configured to receive the uplink data frame according to the first preamble, send the uplink data frame with the second preamble to the base station, and receive a downlink data frame returned by the base station; and receiving, by the terminal, the downlink data frame sent by the relay device.

15. The non-transitory computer readable medium according to claim 13, wherein sending the network access request frame with the first preamble to the relay device further comprises:

in accordance with determining that the terminal does not receive the network access response frame within a first receiving window or a second receiving window after sending the network access request frame with the second preamble, sending, by the terminal, the network access request frame with the first preamble to the relay device;

or in accordance with determining that the terminal receives the network access response frame within the second receiving window after sending the network access request frame with the second preamble, sending, by the terminal, the network access request frame with the first preamble to the relay device.

16. The non-transitory computer readable medium according to claim 13, wherein the method further comprises:

in accordance with determining that the terminal receives the network access response frame within a first receiving window after sending the network access request frame with the first preamble, sending, by the terminal, the network access request frame with the second preamble to the base station.

17. The non-transitory computer readable medium according to claim 13, wherein receiving the network access response frame sent by the relay device further comprises:

receiving, by the terminal, the network access response frame sent by the relay device within a second receiving window after sending the network access request frame with the first preamble.

* * * * *